United States Patent
Wernersbach

(10) Patent No.: US 10,795,368 B2
(45) Date of Patent: *Oct. 6, 2020

(54) MOVER SYSTEM

(71) Applicant: Dexterity, Inc., Palo Alto, CA (US)

(72) Inventor: Glen C. Wernersbach, Cincinnati, OH (US)

(73) Assignee: Dexterity, Inc., Redwood City, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/120,839

(22) Filed: Sep. 4, 2018

(65) Prior Publication Data
US 2018/0373255 A1   Dec. 27, 2018

Related U.S. Application Data

(62) Division of application No. 15/166,370, filed on May 27, 2016, now Pat. No. 10,108,193.

(51) Int. Cl.
*G05D 1/00* (2006.01)
*G05D 1/02* (2020.01)
(Continued)

(52) U.S. Cl.
CPC ............ *G05D 1/0212* (2013.01); *B66F 9/00* (2013.01); *G05D 1/0011* (2013.01); *G05D 1/0297* (2013.01); *G08G 1/00* (2013.01); *H04B 7/04* (2013.01); *G05D 2201/0216* (2013.01); *H04W 84/02* (2013.01)

(58) Field of Classification Search
CPC .. G05D 1/0212; G05D 1/0297; G05D 1/0011; G05D 2201/0216; G05D 1/00; G08G 1/00; B66F 9/00; H04B 7/04; H04W 84/02

USPC ............... 701/2, 20, 23; 705/7.15; 901/1; 700/230
See application file for complete search history.

(56) References Cited

U.S. PATENT DOCUMENTS 4,974,259 A    11/1990 Takahashi et al.
6,810,817 B1 * 11/2004 James ................... B61B 13/04
                                                104/88.02
(Continued)

OTHER PUBLICATIONS

Web page http://wiki.ros.org/Industrial/supporting_hardware. Open Source Robotics Foundation.
(Continued)

*Primary Examiner* — Shardul D Patel
(74) *Attorney, Agent, or Firm* — Van Pelt, Yi & James LLP

(57) ABSTRACT

A moving system comprising a master controller for monitoring and controlling a master operation comprising one or more individual movers such that each mover arrives at predefined end point at selected times. Each mover includes a mover control system that interacts with the master controller and has a predefined virtual vector path with one or more defined end points. The predefined virtual vector path comprises a plurality of discrete points, wherein each discrete point has a vector axis for use by the master controller and the mover control system to direct the mover to move such that it arrives at each defined end point at a selected time. In operation, the master controller functions to modify the predefined virtual path and sends commands to the mover control system in response to changes in the master operations.

13 Claims, 22 Drawing Sheets

(51) Int. Cl.
 *B66F 9/00* (2006.01)
 *H04B 7/04* (2017.01)
 *G08G 1/00* (2006.01)
 *H04W 84/02* (2009.01)

(56) References Cited

U.S. PATENT DOCUMENTS

| | | | |
|---|---|---|---|
| 6,876,107 B2 | 4/2005 | Jacobs | |
| 7,134,258 B2 | 11/2006 | Kalany et al. | |
| 7,859,139 B2 | 12/2010 | Jacobs | |
| 7,931,431 B2 | 4/2011 | Benedict et al. | |
| 8,076,803 B2 | 12/2011 | Jacobs | |
| 8,996,161 B2 | 3/2015 | Wernersbach et al. | |
| 9,008,831 B1 | 4/2015 | Jacobs et al. | |
| 9,104,204 B2 | 8/2015 | Jones et al. | |
| 10,108,193 B2 * | 10/2018 | Wernersbach | G05D 1/0011 |
| 2007/0135964 A1 | 6/2007 | Bonham et al. | |
| 2008/0211178 A1 | 9/2008 | Zimmermann | |
| 2010/0030375 A1 | 2/2010 | Hartmann et al. | |
| 2010/0064929 A1 * | 3/2010 | Post | B60L 13/04 104/283 |
| 2010/0135238 A1 | 6/2010 | Sadri et al. | |
| 2012/0055367 A1 * | 3/2012 | Zayas | B61B 3/00 104/88.01 |
| 2012/0239224 A1 | 9/2012 | McCabe et al. | |
| 2013/0110281 A1 * | 5/2013 | Jones | G05D 1/00 700/228 |
| 2013/0116865 A1 | 5/2013 | Cooper | |
| 2013/0304300 A1 * | 11/2013 | Peake | G05D 1/0217 701/23 |
| 2014/0365258 A1 * | 12/2014 | Vestal | G06Q 10/063114 705/7.15 |
| 2016/0266578 A1 | 9/2016 | Douglas | |

OTHER PUBLICATIONS

Enterprise Manager 1100, Adept Technology, Inc., web page: http://www.adept.com/products/mobile-robots/enterprise-manager/enterprise-manager/downloads/doc_download/172-enterpr.

National Robotics Week, Web Page: http://www.irobot.com/About-iRobot/STEM.aspx.

Advantech, Industrial Wireless, Web Page: http://www.bb-elec.com/Learning-Center/All-White-Papers/Wireless-Cellular/Industrial-Wireless-Selecting-a-Wireless-Technolog.aspx.

User Manual, Motion Coordinate System, Rockwell Automation, Catalog Nos. 1756-HYD02, 1756-M02AE, 1756-M02AS, 1756-M03SE, 1756-M08SE, 1756-<16SE, and 1768-M04SE.

Not attached, video on web page:https://www.youtube.com/watch?v=c-cl19r6kLw.

Not attached, video on web page:https://www.youtube.com/watch?v=CEK7bfBLTCk.

Not attached, video on web page: http://www.metriainnovation.com/video-renderings.

Not attached, video on web page:https://www.youtube.com/watch?v=OGdvjvla1Tc.

P.V.Kumaret et al., Economic Solutions for Indoor Navigation Systems Using RFID Based Positioning Robot, Int. Jour. of Adv. Tech.vol. 02, Issue No. 12, Dec. 2014, pp. 744-752.

C. Hekimian-Williams et al., Accurate Localization of RFID Tags Using Phase Difference, Dept. of Computer Science, Fla. State University, Tallahassee, FL.

Byoung-Suk Choi et al. Localization and Map-building of Mobile Robot Based on RFID Sensor Fusion System, IEEE International Conference on.

Industrial Informatics, Daejeon, Korea, Jul. 13-16, 2008, pp. 412-417.

International Search Report and Written Opinion for Int. App. No. PCT/US2017/034445, filed May 25, 2017, dated Aug. 2, 2017.

\* cited by examiner

MOVER SYSTEM

RELATED PATENT APPLICATIONS

The present application is a Divisional patent application and hereby claims benefit to and incorporates in its entirety by reference the subject matter contained in U.S. patent application Ser. No. 15/166,370 filed May 27, 2016, titled: Mover System.

BACKGROUND OF THE INVENTION

The subject application is directed to a mover system for moving objects and more particularly to a mover system for moving objects having a plurality of in controlled movers operating along an adjustable predetermined pathway.

Mover systems for transporting objects to or from a location historically used humans to directly control the movers, such as carts, forklifts, pallet jacks and overhead cranes. Movers, such as overhead cranes, often used to deliver objects to selected areas within an industrial facility have been automated by gantry systems that typically utilize pulling chains in the X and Y directions to control the path of the objects being transported to a desired location. Many times such automation incorporates rotary motors that operate to adjust the pulling chains while an operator uses levels to target deliveries. In the most automated application of a gantry system, a control system, such as a motion coordinate control system, is used in combination with a human machine interface (HMI) to allow an operator to identify an end point, such as a point on a floor map, and the master controller programmatically operates to transport the object to the identified location.

Assembly systems are often highly automated having programmable control systems, such as PLCs, connected by network cable to a number of servomotors, running chains, conveyers, tracks, mechanical assemblies and the like. The data connections between such components are generally high-speed, time synchronized, deterministic links for obtaining the maximum performance of the assembly system. Network cable has been preferred over wireless connection because it offers higher data reliability with the least chance of outside interference that can cause a loss of data packets being transmitted across the network. If enough packets are lost in a sequence, en entire assembly operation could fail or error.

Assembly systems have also been developed that take the form of an oval shaped platform stand where a chain drives a series of movers to transport objects to various end points, such as mounted tool stands, for receiving machining or assembly operations. Such operations typically require a high degree of position accuracy and repeatability. Accordingly, it is common to stop the mover and tightly pin the object being transported to a stable platform, perform the desired operation, unpin the object and start the mover to advance the object to its next end point (location). This operation typically requires movers or objects thereon to be precisely positioned for pinning. In many operations the tooling stands operate independently of the master controller and their operation can be signaled to start by mechanical means such as a switch or a photo eye. Some operations, especially those moving at high speeds, require the various tooling stands to be under the command of a common master controller so their operations are time synchronized to perform a specific tooling function in a unified movement. A problem with many such moving systems, such as chain based systems, is that all the movers and tooling stands crust operate at the same line speed. If a problem is encountered the entire operation can be interrupted or stopped.

Another moving system that has been developed for increasing speed and flexibility of an assembly line operation includes a master controller connected, such as by a network cable, to a plurality of linear motors arranged generally along an oval rail system for guiding and commanding multiple magnetic movers. Such systems operate whereby multiple electrical motor wire coils are arranged along the track perpendicularly to the line of travel and with one coil place next to the next coil to form a linear length of coils. When the coils are powered with varying electrical current a magnetic field is produced which reacts to a magnetic field created by a plate of magnets attached to a mover to cause movement of the mover. By scheduling the amount of current to each linear motor coil in succession, one can control the forward or reverse movement of the mover. The movers each include bearing based wheels and run on a guiding rail system that can be made out of plastic, rubber or metal. A key constraint of such magnet moving systems is the distance between the movers that can run together along the direction of rail due to the mechanical design of the mover length and by the magnetics of the linear motor stage design control ability.

Another disadvantage with both chain based or magnet moving systems is that the vector path that the movers travel is essentially mechanically fixed for the life of the machine and is not easily reconfigurable without a major redesign of the entire production system. In addition, with respect to magnetic moving systems, the rail system must follow the entire vector looped path, which adds expense to the system. Further, when a bearing begins to wear on one of the movers due to the wheels running along the guiding rail system, there is generally not an easy automated way to remove that mover from a looped configuration without stopping the entire machine for maintenance. For many applications there is also a need for positional accuracy and repeatability requiring independent mover control all the way around the rail system to achieve the maximum product throughput from the system. Because of this need for maximum product throughput, linear motors must be placed around the entire rail system, including the curves, so that the mover travels at a constant rate. This high rate of speed, particularly around curve sections, increases wear of the support wheels connecting the mover to the rail as well as requiring significant bracing or support of the object to prevent centripetal forces from dislodging or ejecting the object from the mover as it travels along the curve section of the track.

With the advent of robots, robotic autonomous guided vehicle (AGV) systems have been developed that are configured as forklifts or carts that allow for the safe transportation of objects without the need for operators to directly control them or the need for fixed rail tracks. Such robotic control systems include a human-machine-interface for allowing an operator to input modifications to the robotic operation, such as to direct the robotic mover to pick up and transport objects, such as bulk quantities of raw material, to be delivered to a specified end point (location). The assembly area control system may also be programmed automatically to order shipments via wireless signals when a robotic mover is needed. While such robotic movers can be commanded to run at certain speed they do not operate under a time scheduled control of a motion plan and do not always follow the same path to go to an assigned end point (destination). Robotic movers of an AGV system are also designed to stop, avoid and steer around humans or other obstacles that occur along their path of travel which changes the time that the mover arrives at an assigned end point. Thus, while the mover may be directed to go to a certain end point (location) there is no specific time goal (scheduled time) as to when it is to arrive. Accordingly, the movers of an AGV system do not operate to speed up automatically if they are behind schedule, often caused because a mover's wheels slip on the warehouse floor or if it had to stop and steel around an obstruction on the way to get to the designated end point. Thus, there is often a significant difference in time between when a mover arrives at a designated end point and when the mover is scheduled to arrive at the end point.

The network connection often employed to communicate with an AGV system is standard off-the-shelf secured wireless technology that may already exists in the facility. The connection is designed to use as little network bandwidth as possible. Since an AGV mover has the ability to operate autonomously for some period of time, it is not necessary to be in constant real time communication with the master controller and therefore some data packets being transmitted are lost, not acknowledged and retried over time. Further, the path tracking systems of most AGV systems operate in very coarse increments and are meant to deliver large objects to an end point. Some AGV path tracking systems use navigation devices such as magnets or other markers positioned on the floor to indicate pathways, rooms and no-go zones while other tracking systems are preprogrammed floor map based systems. Most of the preprogrammed floor map-based systems require a preexisting floor map of the path space and operate to train the robotic mover where any boundaries lie within the control area. Directional sensors, such as laser or sonar, are used during training to help map additional permanent fixtures that are not on the floor plan (such as desks, partitions, and machinery, etc). Without such sensors, an AGV mover would often get "lost" during operation because the rotary servo driving the wheels of the mover would not account for errors such as wheel slippage. Typically, an AGV system operates to maintain an approximate location of a mover by comparing what a sensor or set of sensors detect of the walls and/or fixed objects located within the control area to a floor map taking into the account the number of rotations of the movers wheels taken since the last accurate position. Unfortunately, such path tracking systems are not as effective for large amorphous control areas, such as a warehousing location, where there are not as an fixed unmovable objects to compare against a map. One solution to this problem that has been used is to employ a second sensor or set of sensors that scan certain features, such as ceiling lighting, and adding this information to the AGV's position to map for comparison. However, while this increases the accuracy of the tracking, it also increases the cost of operation and does not provide the needed accuracy for all applications.

Global position satellite systems (GPS) have been developed and are accurate enough for most outdoor purposes. Unfortunately, GPS signals generally cannot penetrate ceilings and walls making such systems unacceptable for most robotic path tracking systems. Various other systems and methods have also been developed using different sensors and include, for example, the use of a compass to map the magnetic signature of various locations against the floor plan map; using multiple Wi-Fi hub signals strength to a fingerprint of each location against a floor plan map; counting the steps and inferring directions a mover is moving; and using a camera to compare pictures to a map. However, none of these location methods have proven accurate enough by themselves for many applications. Further, while in certain control areas the path tracking systems do operate to provide the needed accuracy in to determine the location of a mover along a path, there is no ability to adjust the path parameters or the path of travel of a mover to ensure that the mover arrives at an end point at a specified or scheduled time.

For many applications, assembly or manufacturing systems require positioning systems that are reliable and precision accurate (at least 0.5 mm accuracy) at end points. Wireless, GPS and conventional Radio Frequency Identification (RFID) signal strength triangulation systems have been employed and are relatively inexpensive. However, they often do not provide the required accuracy at critical end points. Visual systems may provide the needed accuracy, they require the sensors to have an unobstructed line of sight which can be relatively difficult to obtain and expensive for use with various equipment layouts in certain applications. Accordingly, they have been used primarily to focus on small areas for synchronizing product transfer between two different pieces of equipment. Magnetic tape or optical scale markers have been used in end points with linear slides and with automated guided vehicles but are often difficult to use along an entire predefined path or to achieve the desired accuracy at speed. Further, free operating movers that stray off the predefine path can get lost and are unable to automatically return to their predefined path. While mover systems operating using a track with linear motors have been developed with a plurality of fixed placed electronic sensors positioned along the track as necessary to get the desired accuracy, this technology can only be read as a mover travels along the fixed predefined path.

Accordingly, what is needed is a mover system for transporting objects and more particularly to a mover system for transporting objects having a plurality of independently controlled movers operating along an adjustable predefined virtual vector pathway that allows an operator to easily modify the path of one or more of the movers; that has a system that operates to modify the movement (path parameters and the mover's path of travel) of each mover to ensure that each mover arrives at a predetermined end point (destination) at a predetermined specified or scheduled time; and has the required accuracy for synchronizing the movement (precise location and arrival times at end points) of the movers.

SUMMARY OF THE INVENTION

The subject invention is a new and novel mover system for transporting objects from one location to another location such that each mover arrives at a predetermined destination at a scheduled or selected time. In a preferred embodiment of the invention, the mover system is a trackless system whereby independent movers are freely driven while operating under the direction of a master controller in a preferred embodiment of the invention, each mover operates in forward and reverse velocities and can change directions to transport an object in a simulated assembly closed loop or reciprocating vector path between end points (stations), such as production stations, and then follow a return path back to a start point (queuing area) before arriving at an initial end point, such as an object loading station.

In a preferred embodiment of the invention each mover is tracked and its position monitored and error controlled by a master controller that transmits control command that insure the mover arrives at irs scheduled time in order to work properly with other tooling and conveyance equipment connected to the system.

In a preferred embodiment the mover system for transporting objects from one location to another location, such that the objects arrive at selected end points at predetermined scheduled time the mover system comprises at least one independent mover that follows a predefined virtual vector path and operates under plan parameters, a propulsion system for moving the mover along a path from a start point to at least one end point, a master controller, a communication network in communication with the master controller, tracking sensors that operate to transmit tracking signals to the master controller through the communication network, wherein the master controller operates to determine a calculated position of the mover and uses the tracking signals to determine the actual position of the mover, and wherein the master controller compares the actual position to a scheduled position and automatically transmits control commands to a mover control system that operates to direct the propulsion system to modify the predefined virtual vector path and/or the plan parameters so that the mover arrives at an end point at the scheduled time.

In a preferred embodiment of the invention the movement of the mover is adjusted such that the mover arrives at all of the selected end points (destinations) at their scheduled times.

In a preferred embodiment of the invention the mover control system interacts with the master controller such that a two or three-dimensional virtual vector path of the mover is automatically adjusted to increase or decrease the amount of time for a mover to arrive at a selected end point.

In a preferred embodiment of the invention the mover control system interacts with the master controller such that the plan parameters of a mover is adjusted to increase or decrease the amount of time for a mover to arrive at a selected end point.

Another preferred embodiment is a mover system for transporting objects from a start point to an end point such that the object arrives at the end point at a scheduled time, the mover system comprising: at least one independent mover having a mover control system that operates to direct the mover to follow a predefined virtual vector path utilizing plan parameters; a propulsion system for receiving mover control commands from the mover control system for moving the mover along a path from the start point to the end point; a master controller; a communication network in communication with the master controller and the mover control system; wherein the master controller operates to determine a calculated position of the mover and transmits mover control commands to the mover control system to direct the propulsion system to modify the plan parameters and/or the predefined virtual vector path to move the mover so that the calculated position matches a scheduled position for the mover.

In a preferred embodiment the master controller operates to periodically adjust the plan parameters so that the mover arrives at the end point at the scheduled time.

In a preferred embodiment the master controller operates such that the mover system is synchronized with the operation of secondary equipment operating in conjunction with the mover system.

In a preferred embodiment the mover system further comprises a detection system in communication with the mover control system such that if the detection system detects an obstruction, the mover control system operates to automatically create a new defined virtual vector path and transmits mover control commands to the propulsion system to follow the new defined virtual vector path.

In a preferred embodiment the mover control system operates to automatically create new plan parameters along the new defined virtual vector path so that the mover arrives at the end point at its scheduled time.

In a preferred embodiment the mover system further comprises a path tracking system that operates to identify specific locations along the predefined virtual vector path.

In a preferred embodiment the path tracking system comprises one or more navigation devices that operate to provide information to the mover control stem which operates to calculate the actual position of the mover and further operates to compare the actual position with a scheduled position and further operates to modify or create new predefined virtual vector path and/or to modify the plan parameters so that the mover travels such that the actual position will continuously match the scheduled position and arrives at the end point at the scheduled time.

In a preferred embodiment the path tracking system comprises navigation devices in the form of magnetic or inductive markers that operate to provide location information to the mover control system when detected by tracking sensors positioned on the mover and wherein the tracking sensors are angled magnetoresistive or inductive sensors positioned in a pattern on the mover and operate to provide the mover control system with direction of travel of the mover.

In a preferred embodiment the path tracking system comprises navigation devices in the form of radio frequency identification tags positioned within a control area and operate to transmit absolute location coordinates to the mover control system.

In a preferred embodiment each independent mover comprises a pair of coaxially aligned wheels and at least one steering wheel and a cover having a bumper assembly and an indented section configured to mate with a bumper assembly of another mover to minimize pitch between movers.

In a preferred embodiment of the invention the mover system comprises a propulsion system that operates in a forward and reverse directions and to change the plan parameters of the mover such that the mover operates in a control area defined by coordinate space in at least two-dimensions such that the mover follows a predefined virtual vector path that returns to its start point and such that the mover's motion is time scheduled and error corrected by commands from the master controller to the mover control system.

In another preferred embodiment of the invention the mover system comprises a track and whereby a mover travels along the track using magnetic levitation and propulsion.

In a preferred embodiment of the invention the mover system comprises a plurality of electromagnetic propulsion coils arranged to permit the mover to travel in two dimensions.

In a preferred embodiment of the invention the mover system comprises a plurality of electromagnetic propulsion coils to permit movers to travel in three dimensions.

In a preferred embodiment of the invention the mover system includes a communication system for communicating commands and information to and from the master controller to the mover control system, wherein the communication system uses multiple wireless frequencies bands to communicate for control and feedback in areas where high amounts of radio transmission interference (RTI) is present.

In a preferred embodiment the communication system uses wireless communication for communicating with the mover such that commands are repeated using one or more wireless frequency bands to insure that communication packets are received by the mover control system in heavy environments.

In another preferred embodiment of the invention the communication system comprises multiple antennas positions around the physical platform space for receiving a location signal being generated by the mover control system and whereby the master controller operates to measure the strength of the location signal and uses triangulation to determine the position of the mover in the global coordinate system.

In another preferred embodiment of the invention the communication system uses one or more visual cameras that operate with the mover control system to identify key parts of the control area and transmit information to the master controller that operates to determine the actual position of the mover in the coordinate system.

In another preferred embodiment of the invention the communication system uses markers mounted with the control area and one or more sensors positioned on the mover that cooperate to transmit information to the master controller which operates to determine the actual position (global coordinates) of the mover.

In another preferred embodiment of the invention the communication system comprises a sensor mounted to an external device that operates to detect when a mover travels past the device and transmits information to the master controller.

In a preferred embodiment of the invention the mover system further comprises a mechanical system for securing the position of the mover and/or an object being transported by the mover during a mechanical operation being performed on the object.

In a preferred embodiment of the invention the mechanical system for securing the position of the mover and/or the object uses a pinning system to lock the location of a stopped mover in a fixed location.

In a preferred embodiment of the invention the mechanical system for securing the position of the mover comprises a guiding rail placed along a track effective for providing addition mover stability.

In a preferred embodiment of the invention the master controller operates to vary the plan parameters of a mover as it travels along the predefined virtual path to synchronize the mover with secondary equipment (one or more external operational devices).

In a preferred embodiment of the invention the master controller operates to vary the plan parameters or the path of travel of the mover to reposition and resynchronize the mover in relation to other movers traveling along the same predefined virtual path.

In a preferred embodiment of the invention the master controller includes a human-machine interface that operates to communicate the removal or additional one or more movers of the mover system and whereby the master controller operates to adjust the plan parameters of the additional other movers to adjust for the increase or decrease of movers traveling along the path.

In a preferred embodiment of the invention the mover includes a battery and an electric mover charging device that cooperates with an external charging device such that when the electric mover charging device is in close proximately with the external charging device they charge the battery on the mover.

In a preferred embodiment of the invention the mover system further comprises electromagnetic levitation coils, propulsion coils and levitation magnets and propulsion magnets mounted to the mover to produce magnetic levitation and motion along a track.

In a preferred embodiment of the invention the electromagnetic levitation coils rotate so the angle of direction of movement of the mover can be changed.

In a preferred embodiment of the invention the master controller calculates the amount of speed or path correction needed to ensure a mover arrives at a location at a predetermined time (scheduled time) and compares it to a reference and uses the comparison to determine the probability that one or more of the wearable parts on the mover needs replacement.

In a preferred embodiment of the invention each mover includes an cover or an encasement for electronics, connectors, and any non-critical parts to the operation of the mover that is suitable for washing or spraying with water or other soap based clearing agents.

In a preferred embodiment of the invention the human-machine interface operates such that users can input into the master controller a representation of the virtual path that each mover will follow and whereby the master controller operates to translate the representation into executable motion control commands for transmitting to each mover control system.

In another preferred embodiment of the invention the human-machine interface operates to allow an update or modification to an existing virtual path for one or more movers and whereby the master controller operates to translate that updated representation into executable motion control commands for transmitting to each mover control system.

A preferred embodiment of the moving system of the subject invention comprises a master controller for monitoring and controlling a master operation comprising one or more individual movers such that each mover arrives at predefined end point at selected times (scheduled times). Each mover includes a mover control system that interacts with the master controller and has a predefined virtual path with one or more defined end points. The predefined virtual path comprises a plurality of discrete points, wherein each discrete point has a vector axis for use by the master controller and the mover control system to direct the mover to move such that it arrives at each defined end point at a selected time. In operation, the master controller functions to modify the predefined virtual path and sends commands to the mover control system in response changes in the master operations.

In another preferred embodiment of the invention the master control system operates such that standard movement commands from the master controller is converted into new two or three dimensional virtual path.

Various other objects, advantages, and embodiments of the invention will be apparent from the Mowing description, the accompanying drawings, and the appended claims.

BRIEF DESCRIPTION OF THE DRAWINGS

To provide a more complete understanding of the present invention and further features and advantages thereof, reference is now made to the following description taken in conjunction with the accompanying drawings in which.

DESCRIPTION OF THE INVENTION

Figure 1:
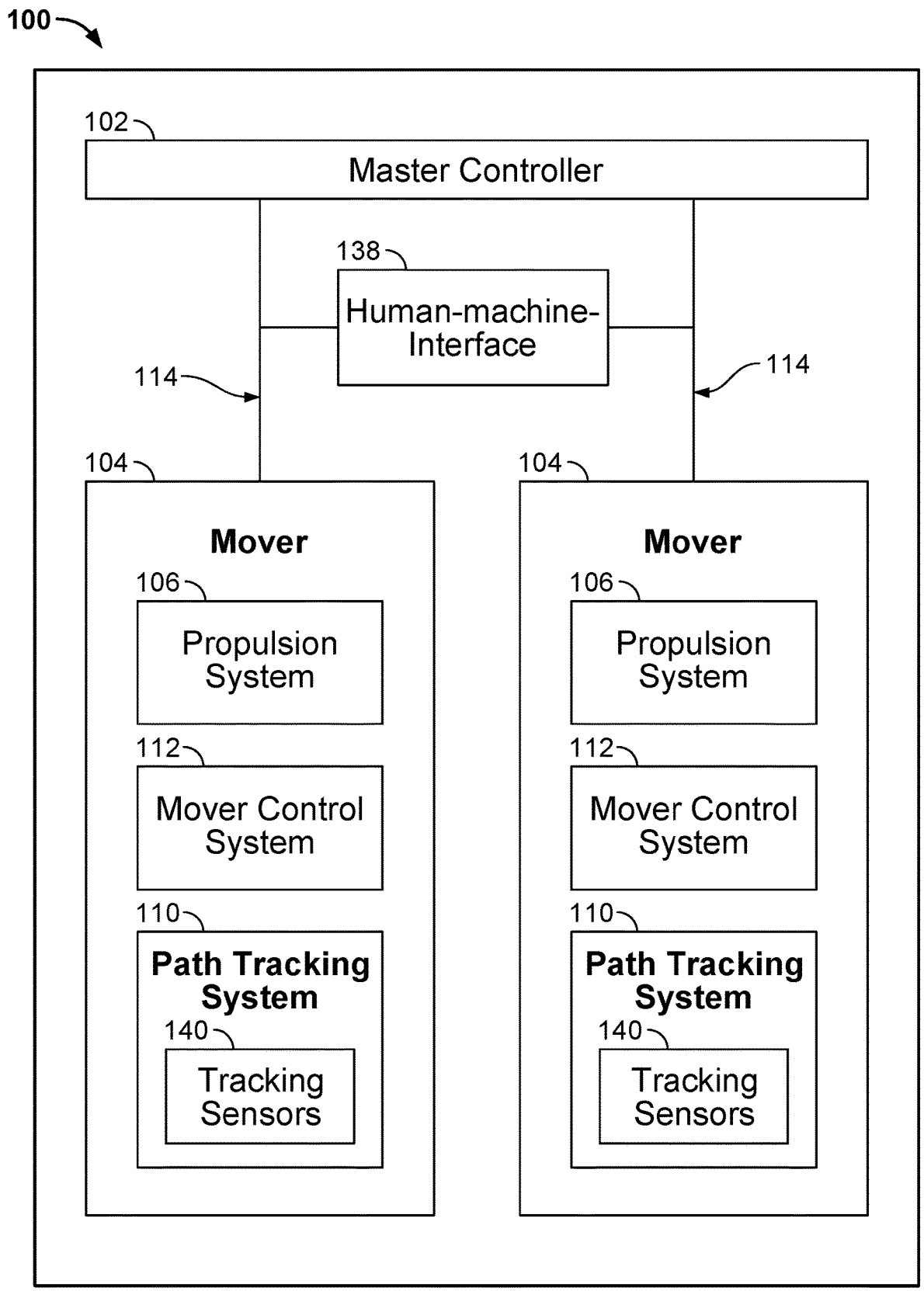
FIG. 1 a schematic representation of a preferred embodiment of a mover system of the subject invention comprising one or more movers each having a propulsion system, a mover control system and a path tracking system in communication with a master controller by a communications network.

The subject invention is a new and novel mover system for transporting objects from one location to another location such that each mover arrives at a selected destination at a predetermined scheduled time. In a preferred embodiment of the invention, the mover system is a trackless system whereby independent movers are freely driven along a predefined virtual vector path operating under the direction of a main controller that provides control commands having x and y components. In a preferred embodiment of the invention, each mover operates in forward and reverse velocities and can change directions to transport an object in a simulated assembly closed loop or reciprocating vector path between end points, such as production stations and/or loading and unloading stations, and then follow a return path back to a queuing area before arriving at an initial start point.

As used herein e platform is an x and y coordinate surface that a mover travels along having a vertical z axis. The terms "up" or "upper" refers to the z direction away from the platform (path surface) and the term "down" or "downwardly" refers to the z direction towards the platform (path surface).

In a preferred embodiment of the invention, a master controller uses a one dimensional virtual rotary axis data structure (which unlike master controllers used to operate rotary servo drives through the control of one dimensional axis date objects) for operating independently control movers traveling along a predefined path. Motion plan parameters (such as mover speed, acceleration direction or travel) for points along the path of travel are captured and transferred electronically over a communications network to a traffic control system of the master controller. The length setting in the virtual axis data structure is the length of the predefined virtual defined path (virtual vector path loop) that one or more movers follow. Feedback, status and error information is received and calculated by the traffic control system and stored in tags in a memory bank of the master controller which can be used programmatically and/or displayed on a human-machine interface (HMI). Preferably, the HMI operates such that users can input into the master controller a representation of the virtual vector path that each mover will follow and the master controller then operates to translate the representation into executable motion control commands for transmitting to each mover's control system. It should be understood that the predefined virtual vector path comprises a plurality of discrete points wherein each discrete point has a vector axis for use by the master controller in directing a mover such that it follows the predefined virtual path and arrives at an end point at a selected time. The master controller further operates to continuously or periodically monitor individual movers and if it determines that a mover will arrive at an end point ahead of or behind its scheduled time, the master controller operates to adjust the virtual vector path to create a new virtual vector path and/or adjust the path parameters along one or more discrete points such, that a mover arrives at its predefined end point at the scheduled time.

Mover System

Figure 2:
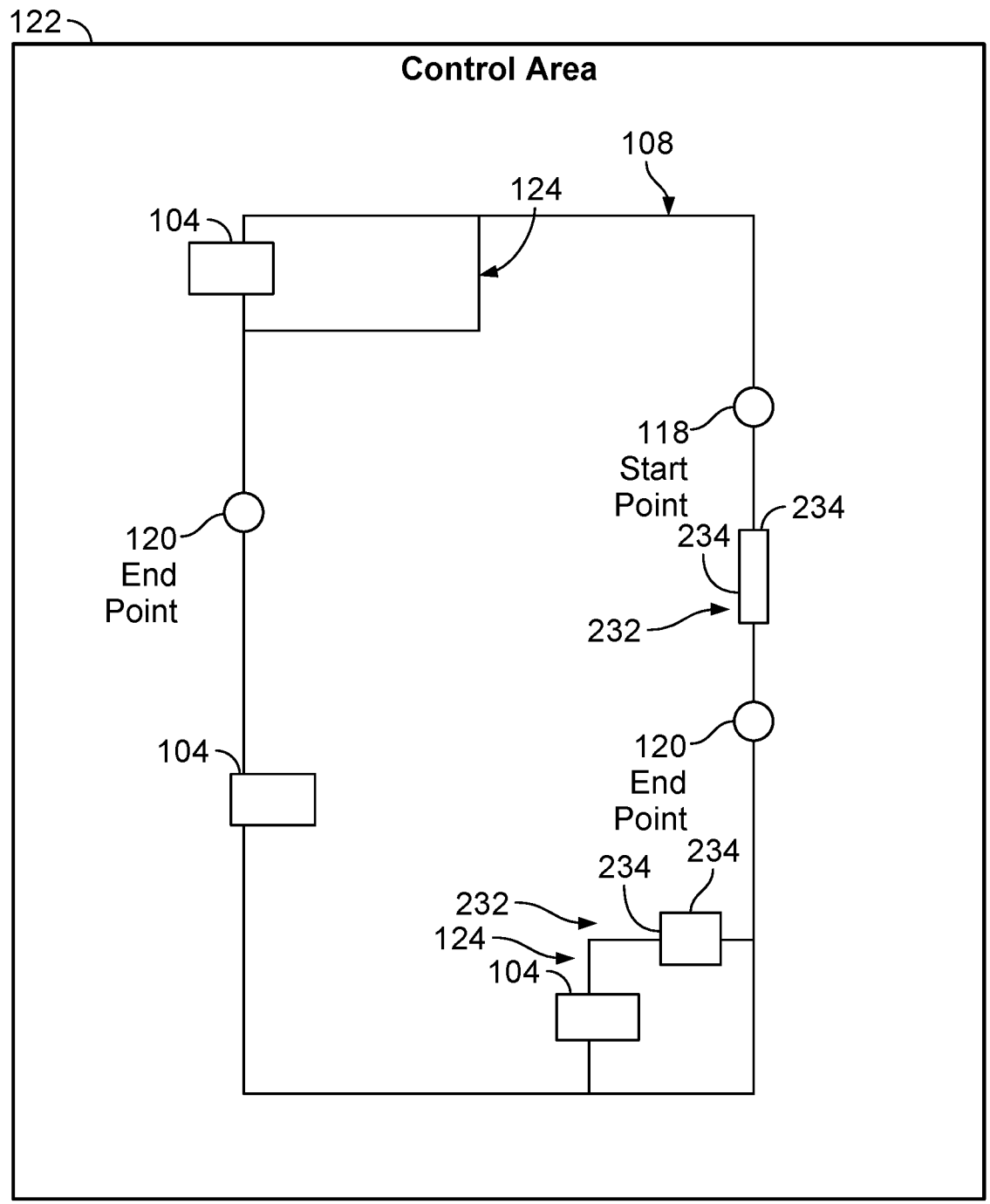
FIG. 2 is a schematic representation of the control area having the mover system of FIG. 1 illustrating one or more movers traveling along a path having a start point, one or more end points, and one or more alternative paths.
Figure 3:
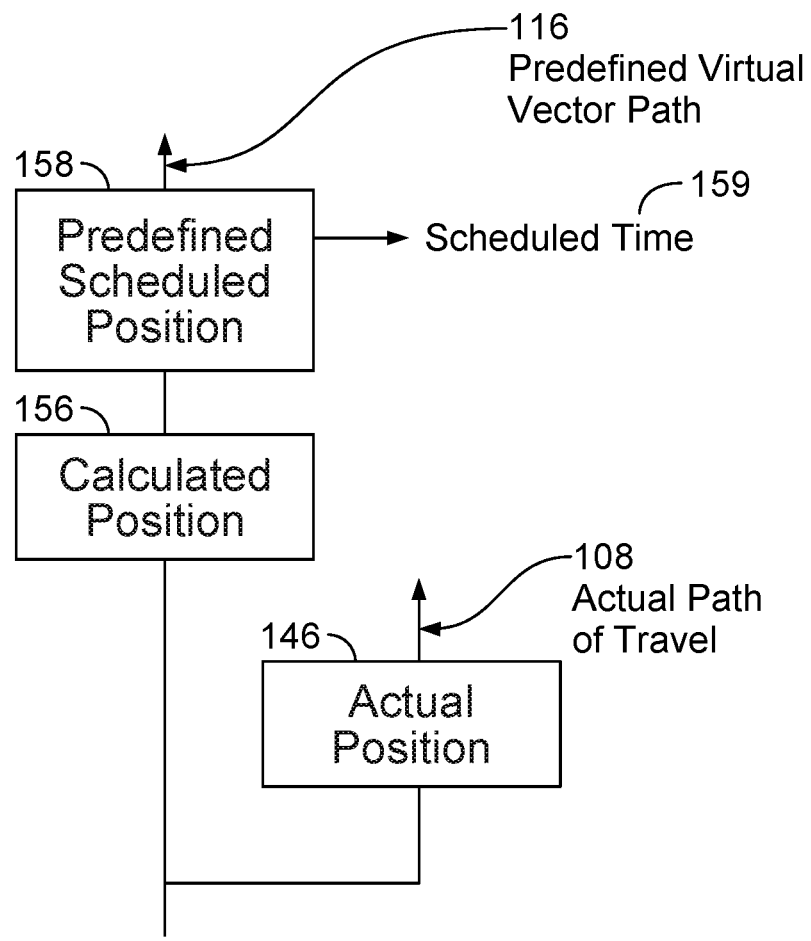
FIG. 3 is a schematic representation of a mover following a predefined virtual path showing the calculated position of the mover and the actual position of the mover, its calculated position and its actual path of travel.

Referring to FIGS. 1, 2 and 3, schematic exemplary illustrations of a mover system for transporting objects 100 is shown having a master controller 102, one or more movers 104 each having a propulsion system 106 for propelling the mover 104 along a path 108, a path tracking system 110 and a mover control system 112 both in communication with the master controller 102 through a communication network 114. A predefined virtual vector path 116 for each mover 10 is programmed by the master controller 102 for directing the mover 104 to travel from a start point 118 to one or more end points 120 within a control area 122. It should be understood that as used herein the term "start point" is the point at which a mover begins to travel along the predefined virtual vector path 116. Such a "start point" can also be the "send point" of another defined path. An "end point" as used herein is a predefined destination, location, or station (such as a loading or unloading station, a holding area, battery recharging area, repair area, or a manufacturing or machining station) that a mover is to travel to and preferably receive an object and/or deliver an object and/or to place an object in position for receiving an operation, such as a machining operation, or for repair and maintenance. Preferably, the control area 122 is defined for a mover system 100 and can include one or more actual paths of travel 108 that a mover 104 takes while following its predefined virtual vector path 116. It should be understood that the predefined virtual vector path 116 is the path that a mover is programmed to follow and the actual path of travel 108 is the path that the mover actually takes while traveling from the start point 118 to the various end points 120 and back to the start point 118. It should also be understood as described below that the predefined virtual vector path 116 may be the same or different than the actual path of travel 108. Further, it should also be understood that the predefined virtual vector path 116 is preferably a closed loop path or a closed loop path having one or more side paths 124 and may be identical to the paths being traveled by one or more other movers or may be a path unique for a particular mover.

Path Planning

The master controller 102 is preferably a standard industrial programmable logic controller (PLC) such as those typically used for operating a rotary servo drives through the control of one dimensional axis data objects. Conventionally, an axis data object specifies the length of the circumference of the rotary servo driven wheel, chain, belt or otter end effector. The avis data object usually also has dynamic limits for a motion parameter, such as speed, acceleration, jerk etc. Motion commands 126 (FIG. 4) such as to travel from one end point to another end point or to rotate at a certain speed, are performed using software programmatically on the axis data object. Often, all of the equipment in an assembly area are operated by a single master controller and are slaved to a master physical, or virtual axis' control. The slaving process permits the entire assembly process to speed up or slow down by simply adjusting the speed of the master axis, in a preferred embodiment of the invention, the master controller 102 uses a one-dimensional virtual rotary axis data structure. The predefined virtual vector path 116, together with the plan parameters 128 (such as speed, acceleration and deceleration, time, and other operational parameters) for a mover 104 traveling along the predefined virtual vector path 11 are programmatically inputted, such as by use of the human-machine-interface 130, into the traffic control system 132 (FIG. 4) of the master controller 102. It should be understood that in the subject invention the length setting in the virtual axis data structure is the length of the predefined virtual path to be followed by a mover and the dynamic velocity limit is the maximum speed that a mover can travel. It should also be understood that in a predefined embodiment the master controller 102 operates such that secondary equipment 10 (such as loading, unloading, packaging, assembly and machining equipment) operating in conjunction with the mover system functions under a physical or virtual axis control which is synchronized with the operations of the master controller 102 directing the mover system 100. Accordingly, in operation when the master controller speeds up or slows down the master axis of an operation (such as an assembly, manufacturing, packaging, transportation operations and the like) the mover system 100 operating in conjunction with the operation can operate to automatically speed up or slow down accordingly.

In another preferred embodiment of the invention the master controller operates as a motion coordinate control system capable of issuing two-dimensional commands directly, such as motion coordinate control systems using x and y dimensions of mechanical gantry or H-Bot systems. In a preferred embodiment, the coordinate system utilized is the global coordinates of the control area or along the platform and paired sets of x and y virtual axis or similar data structures are assigned to each mover. The intersection of the x and y data structure's position setting is considered the object (mover) mechanical "end point." A combination straight and curved motion commands are then programmatically transmitted to the mover control system using the communication network for directing a mover using the coordinate system to follow a predefined virtual vector path. It should be understood that a predefined virtual vector path can be a path loop programmed without the need for external path planning software. It should also be understood that the preferred embodiment permits master controller to direct a mover to deviate from the predefined virtual vector path to an alternate virtual vector path such as to perform a specific purpose such as an alternate operation or for servicing (maintenance) of the mover.

In another preferred embodiment of the invention, the master controller is a robotic type controller system that point streams two-dimensional Cartesian commands to an apparatus, device or system, such as used to control industrial robots. The master controller operates to periodically download a series of x and y position commands to the mover control system for each mover as to where it should be (predefined scheduled position) at a specified time (scheduled time). The x and y positions are in a statically stored data array and are spaced positions on the predefined virtual vector path that the mover is to follow. In another preferred embodiment, the master controller operates to include trajectory information for the path and plan parameters (i.e. velocity) that the mover should follow between commanded position points (discrete points along the predefined virtual vector path). It should be understood that the use of such position points permits a mover to be monitored and controlled to operate within tight position accuracy, preferable less than 5 mm. If no trajectory information is issued, the mover control system operates to match the vector angle of the transition between these position points and commands a plan parameters (i.e. speed) that matches the required time interval to travel between such points. In a preferred embodiment, the plan parameters and trajectory information are provided so that a mover moves without abrupt changes in its direction of travel or with regard to a plan parameter. For example, in changing direction, the mover can follow a clothoid or approximate clothoid arc to minimize any abrupt variation in curvature that can cause variation in centripetal force acting on the mover. In another preferred embodiment a mover operates along a predefined platform having curve portions in the form of clothoid arcs, which can be banked to reduce wheel slippage and/or to reduce the effects of centripetal force acting on the mover. It should now be apparent to one skilled in the art that the preferred amount of banking (bank angle) can be easily calculated and is contingent on the surface features of the platform, and the acceleration, weight and dimensions of the mover traveling along the path.

In another preferred embodiment, conventional path planning software is used to create a standard virtual path loop, such as used on a controller system with a one-dimensional vector rotary axis to be slaved to a master axis which can be time synchronized with other equipment. A motion coordinate system, as described above is utilized by the master controller that sends control commands to the mover control system that operates to direct the propulsion system to deviate off the predefined virtual vector path such as when a mover requires maintenance. In a preferred embodiment, the master controller can also operate to direct a replacement mover by sending commands to the mover control system of another mover which operates to direct the mover to follow the predefined virtual vector path of the replaced mover while the mover to be replaced is directed along a side path to an alternative end point, such as a maintenance or repair station. It should be understood that the path and plan parameters of the mover preferably are adjusted, automatically or by use of a HMI, so that the replacement mover arrives at the scheduled end point(s) at the scheduled time. In this way, movers can be taken in and out of the moving system without interfering or hindering the operation of the mover system as well as any secondary operations.

It should be understood that the master controller operates as if it is commanding individual, non-related movers each operating along its own path. Accordingly from the master controller perspective, it operates as if it is controlling separate movers running on paths within separate control areas with no chance of movers colliding. For an exemplary illustration, if the moving system is configure to run with six movers, the master controller operates as if there were six separate paths or platforms with one mover each. To avoid collision and make sure that no movers are commanded to occupy the same space at the same time programmatically. This is done by the traffic control system of the master controller that operates to overlay the predefined virtual vector paths of the movers an comparing commanded positions and times. It should be understood that detecting systems can also be incorporated that operate to ensure that no two movers are in danger of colliding with each other by comparing their actual positions together with their predefined virtual vector paths.

In operation, the master controller 102 operates to synchronize the independently controlled movers 104 with the timing needs of the various end points (stations) 120 (such as tooling, machining and/or product conveyance equipment) under its control. In a preferred embodiment, the master controller 102 functions to synchronize the movements of the movers 104 with a common master timer 134 utilized throughout all the secondary equipment 10 within the control area 122 and can be incorporated into the master controller 102 or can be an independent timer or a timer within another device within the control area 122.

Figure 4:
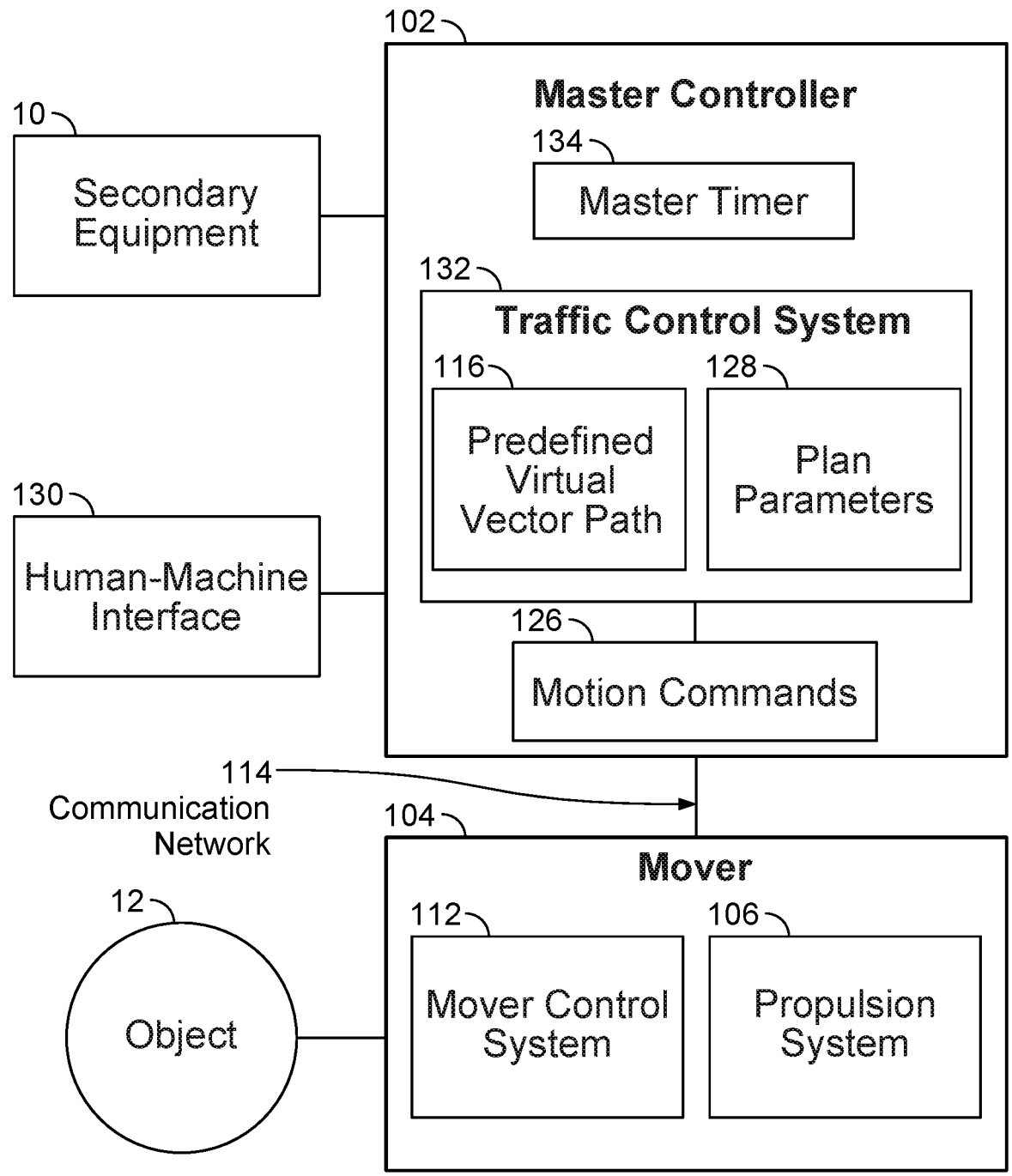
FIG. 4 is a schematic representation showing the master controller in communication with secondary equipment and human-machine interface and a mover for receiving an object.

In a preferred embodiment, as illustrated in FIGS. 2 and 4, the master controller 102 operates to select a mover 104 that is to arrive at an end point (station) 120, to receive or deposit an object 12. In a preferred embodiment, secondary equipment 10 such as a conveyor, belt, wheel or robot operating in conjunction with the mover system 100 can signal via photo eye, switch or other method to the master controller 102 that an object 12 is coming to the selected end point 120 (pick-up station). The master controller 102 operates to send motion commands 126 through the communication network 114 to the mover control system 112 of a selected mover 104 to direct the mover 104 to travel from its current position (such as from a queuing area) to the selected end point 120 (such as a loading station). The motion commands 126 transmitted to the mover control system 112 are in the form of seed, commands and/or directional commands to direct the mover to follow a predefined virtual vector path 116 utilizing plan parameters in (speed, velocity, acceleration) such that the mover 104 is synchronized with its arrival at the selected end point 120 (loading station) that matches the arrival of the object(s) 12 at the end point 120 (loading station). Accordingly, the master physical or virtual axis of an industrial operation (secondary equipment) is synchronized with the mover system. In another preferred embodiment of the invention, the master controller 102 can further transmit motion commands 126 to the mover control system 112 causing the mover 102 to stop and wait for the object 12 to arrive or to direct the mover 104 to one or more mover pick-up stations (end points 120) in order to pick-up multiple objects. It should be understood that objects are arriving in a non-uniform spaced manner, for example an operation whereby movers are placed under fixed filling nozzles or being shrink wrapped together for eventual boxing, the master controller 102 operates to issue motion commands 126 for individual movers 104 that varies their plan parameters 12 after they leave an end point 120 (product loading station) to create uniform spacing (pitch)

between the movers 104 before they arrive at the next end point 120 (station). In another preferred embodiment, the master controller 102 operates to transmit motion commands 126 to a mover's control system 112 to synchronize the speed of the mover 104 as it passes by an end point 120 (such as a tooling station for a specific operation, such as to match the speed needed for a print head printing a serial number on the object). In another preferred embodiment the master controller 102 can further operate to transmit motion commands 126 to a group of movers 104 traveling closely together to modify their plan parameters 128, such as to accelerate to an end point 120 (such as a product unloading station) to arrive at the scheduled time so an object 12 can be placed in a carton or box as a group. The movers 104 are synchronized by the master controller 102 to be moved out of the way on the end point 120 in time for the next group of objects to arrive at the end point 120 (unload station) and picked up by another mover or movers.

Detection System

Figure 5:
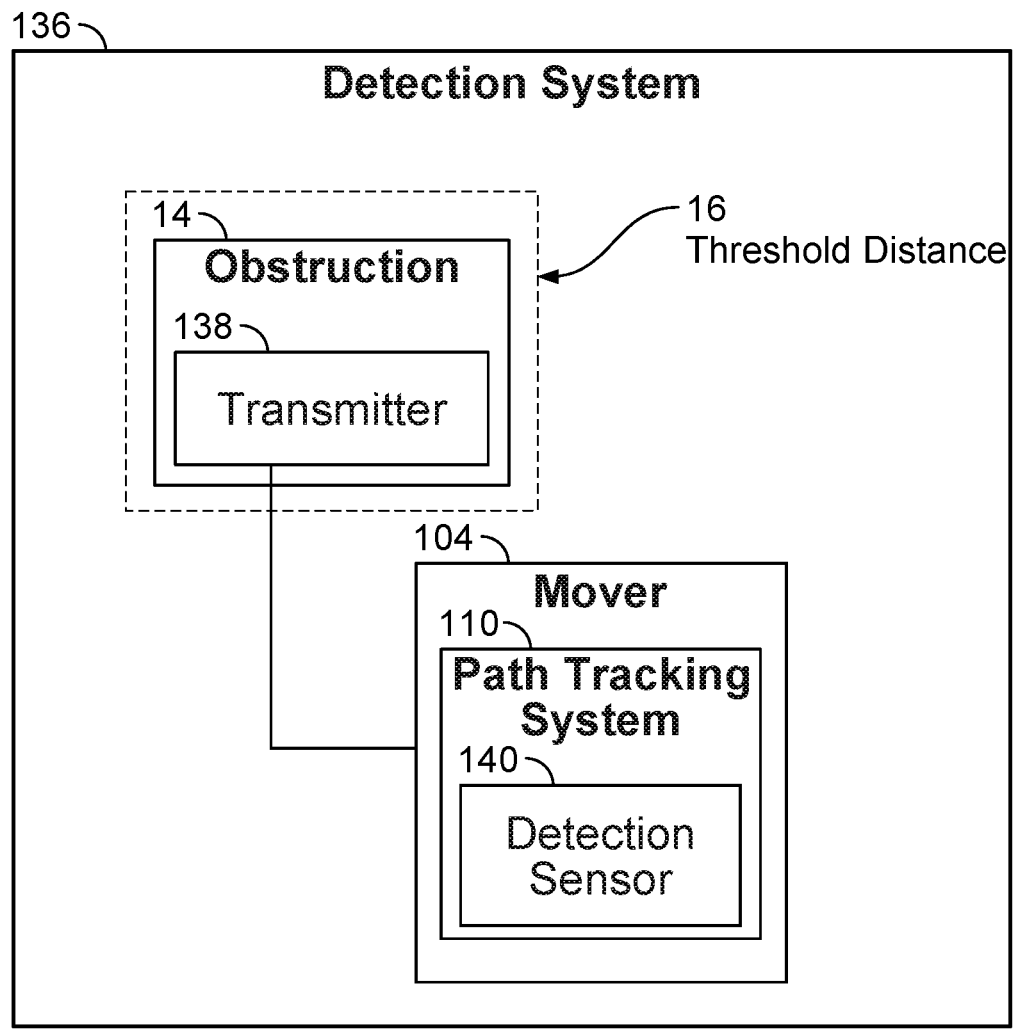
FIG. 5 is a schematic representation of the detection system showing an obstruction having a transmitter thereon and a detection sensor on the mover and a threshold distance around the obstruction.
Figure 6:
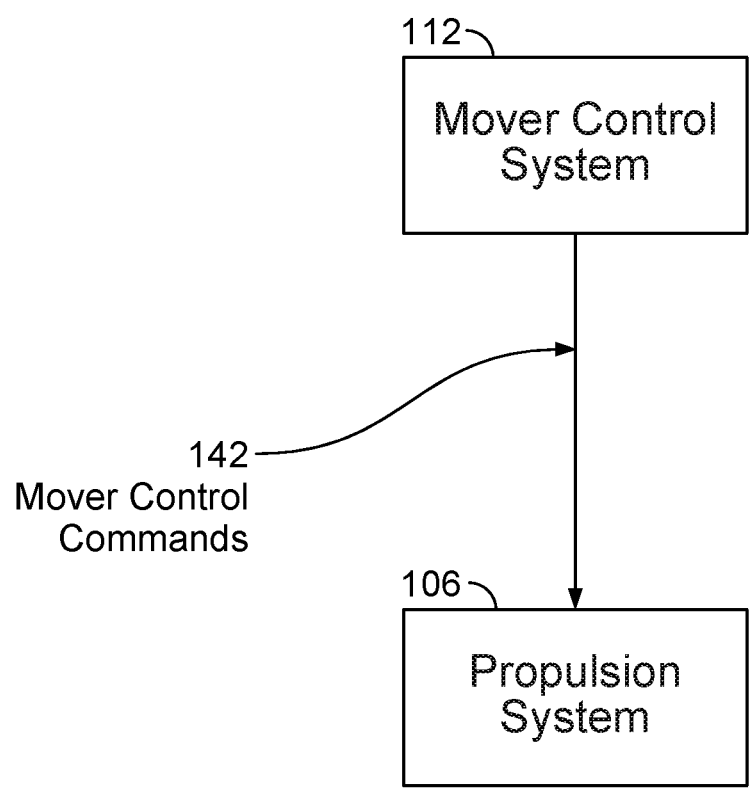
FIG. 6 is a schematic representation showing the mover control system of a mover sending mover control commands to the propulsion system.
Figure 7:
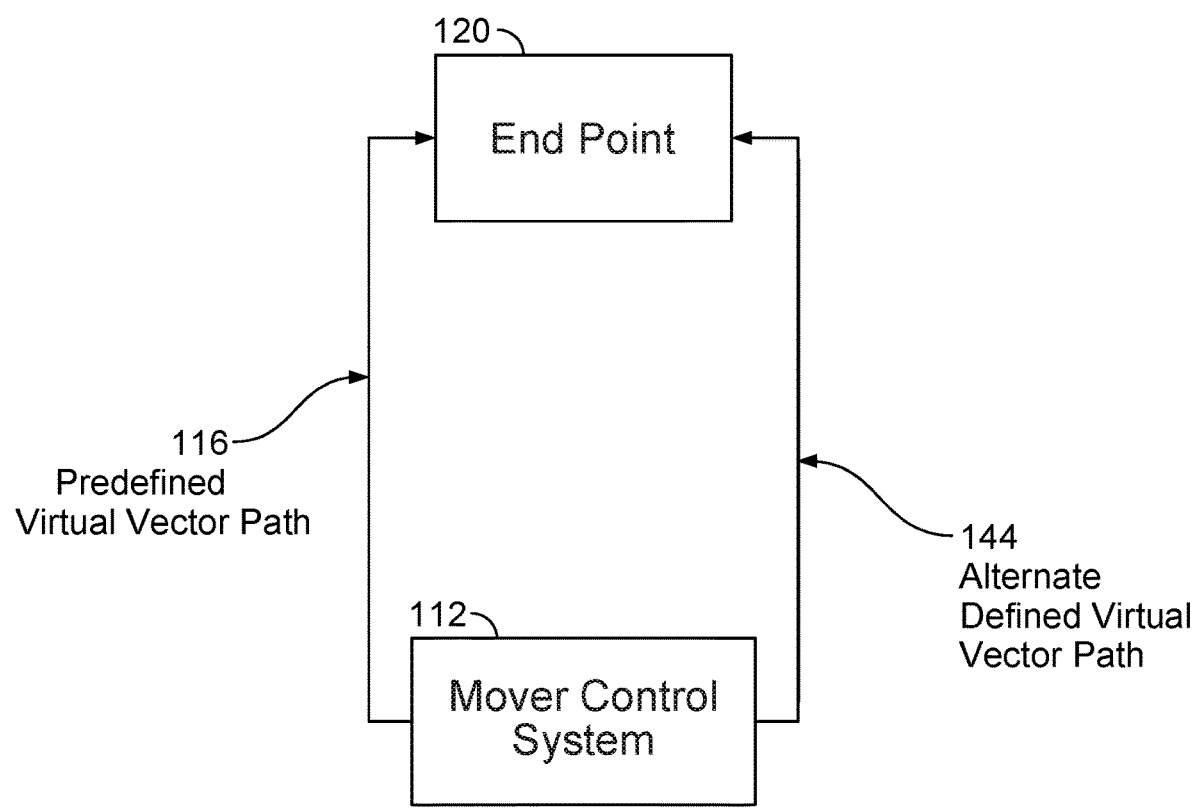
FIG. 7 is a schematic representation showing the mover control system showing a predefined virtual vector path for a mover to travel to an end point of an alternate defined virtual vector path for a mover to travel to the same end point.

Referring to FIGS. 1, 2, 3 and 5, in a preferred embodiment of the invention the control area 122 is a dedicated area, such as a closed-loop track, for operating one or more movers 104. The actual path of travel 108 within the control area 122 preferably include various detection systems 136 that cooperate with the path tracking systems 110 on each mover 104 to ensure, that a mover 104 does not contact (collide) with an obstruction or another mover. It should be understood that the obstruction 14 may be a fixed object or temporary obstruction that was placed at a location after the predefined virtual vector path 116 was programmed into the master controller 102 or is an object positioned temporary at a location (such as a person a disabled mover, package, or other type of object) that obstructs an approaching mover traveling along its predefined virtual vector path 116. In a preferred embodiment as illustrated in FIG. 5, the detection system 136 includes a transmitter 138 positioned on the obstruction 14 such that if detected by a detection sensor 140 of the path tracking system 110 on a mover 104 as it follows its predefined virtual vector path 116, it causes the mover control system 112 or the master controller 102 to automatically calculate and determine it the mover's predefined virtual vector path 116 will result in the mover traveling within a particular threshold distance 16 from the obstruction 14. If the distance is below the set threshold, the mover control system 112 operates to send mover control commands 142 to the propulsion system 106 (FIG. 6) and the predefined virtual vector path 116 is amended creating a new or alternate defined virtual vector path 144 (FIG. 7) or to an alternative side path 124 (FIG. 2) to ensure that the mover 104 does not intersect and collide with the obstruction 14. Accordingly, it should now be apparent that the detection system cooperates with the mover control system such that if the detection system detects an obstruction the mover control system automatically operates to create a new or modified defined virtual vector path and transmits mover control commands to the propulsion system so that it operates to move the mover such that it follows the new or modified defined virtue vector path. Further, the mover control system operates to create plan parameters along the new defined or modified virtual vector path so that the mover arrives at the end point(s) at the scheduled time.

In a preferred embodiment of the invention the traffic control system 132 operates to ensure that the mover's movement along the predefined virtual vector path 116 does not result in the mover 104 contacting (colliding) with an obstruction 14 or another mover by using the mover's predefined virtual vector path 116 and the mover's actual position 146 (FIG. 3) and if the traffic control system 132 determines that contact is possible or is within a set threshold distance 16, it further operates (such as by using of standard proportional, integral, derivative (PID) closed loop theory) to determine adjustments or corrections to the plan parameters 128 (such as but not limited to changes to the mover's velocity, acceleration and/or path) necessary to avoid contact with an obstruction 14 or other mover and return to the mover's predefined virtual vector path 116 (or to begin traveling along a new, alternate or modified virtual path). The master controller 102 then transmits motion commands 126 to the mover control system 112 for directing the propulsion system 106 to implement the calculated changes in the plan parameters 128. In another preferred embodiment, the mover control system 112 operates independently to direct the propulsion system 106 to calculate and implement the calculated changes in the plan parameters 128. It should be understood that in a preferred embodiment, the master controller or the mover control system operates such that changes in the plan parameters permits a mover to adjust or change its path of travel while arriving at each end point at the scheduled times.

Communication Network

The communication network 114 preferably is a wireless communication network that uses one or more frequency bands for communication between the master controller 102 and the individual mover control systems 112 and between the master controller 102 and the human-machine-interface (HMI) 130. Preferably, the master controller 102 and the mover control systems 112 operate to redundantly repeat sending communication packets using the same frequency band as well as sending duplicate communication packets over multiple frequency bands in the event of possible interference, such as from, radio or television interference. For a non-limiting illustration, by using multiple wireless bands, such as Wifi in cooperation with Bluetooth, provides redundancy and minimizes the likelihood of communication interruption. Accordingly, using such multiple communication redundancies over the wireless communication network 114 operates to achieve improved reliability of realtime connections with the movers 104 necessary for the mover's position and motion to be time synchronized.

Tracking System

Figure 8:
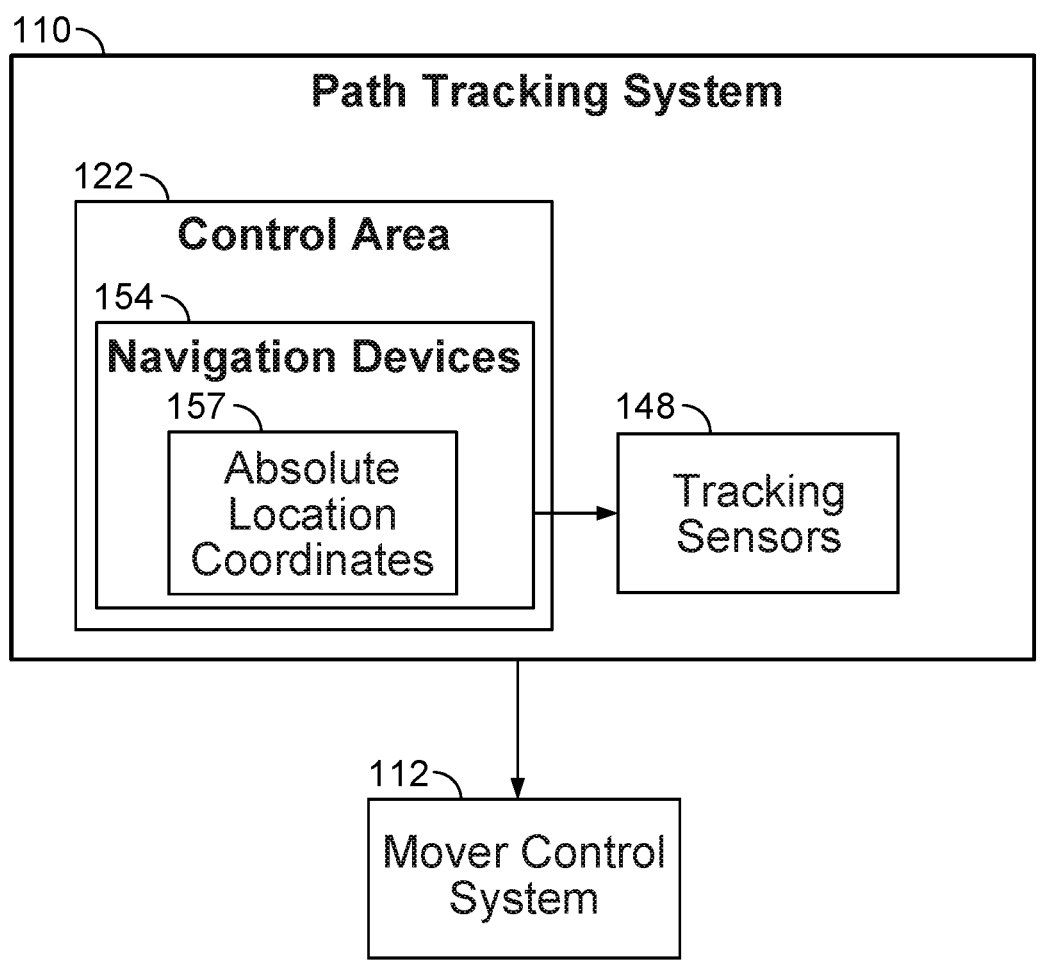
FIG. 8 is a schematic representation showing the path tracking system having navigation devices and tracking sensors in communication with the mover control system.
Figure 9:
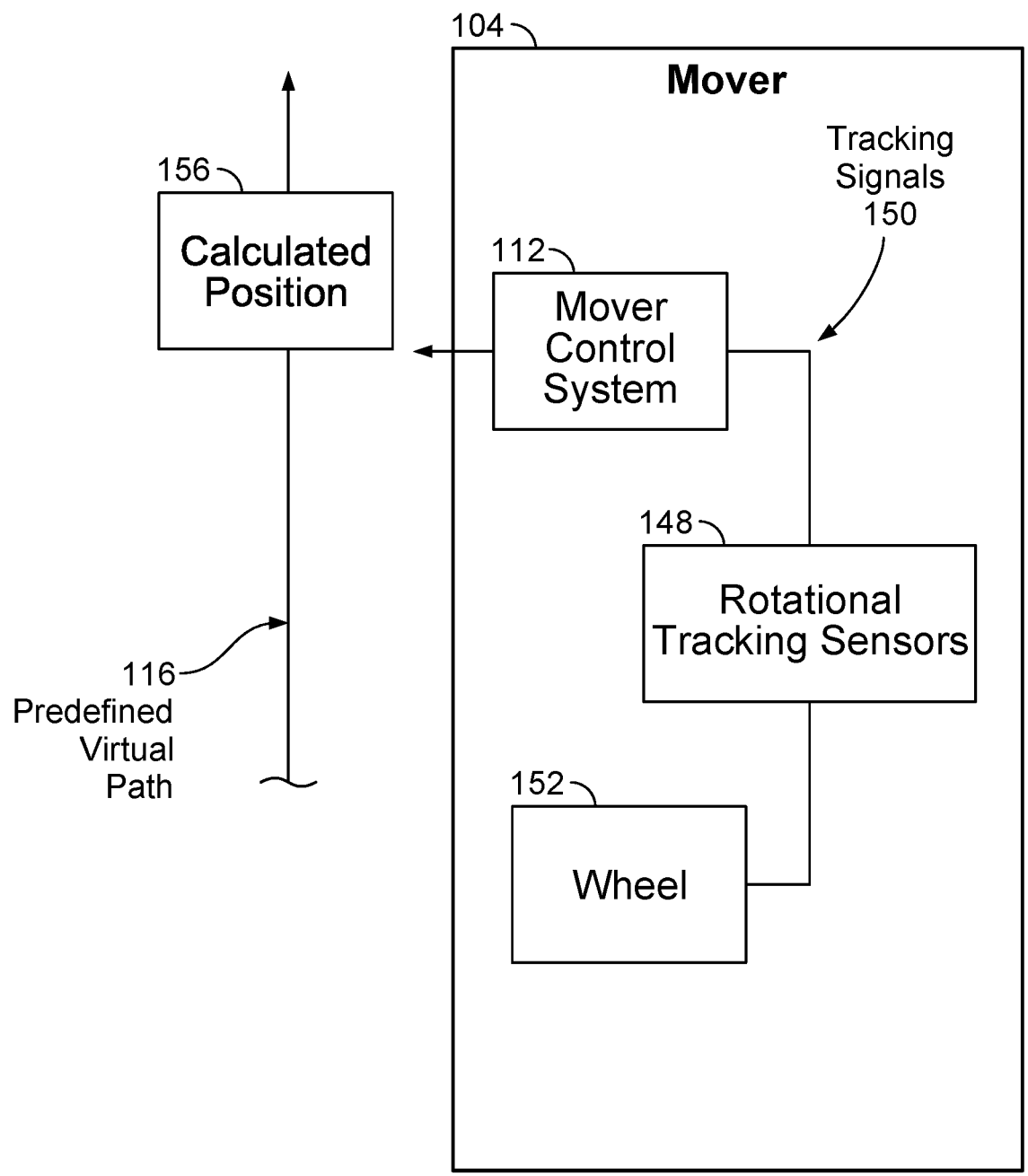
FIG. 9 is a schematic representation showing a mover having a over control system and rotational tracking sensors for tracking the number of rotations of a wheel attached to the mover and used to calculate the position of the mover in relation to the mover's predefined virtual path.

In a preferred embodiment, as illustrated in FIGS. 8 and 9, the path tracking system 110 includes navigation devices 154, such as path markings, positioned within the control area 122, such as along the predefined virtual vector paths 116, and are programmed in the mover system 100 and operate to identify specific locations or to guide a mover 104 along the predefined virtual vector path 116. In other preferred embodiments, the navigation device 154 comprise magnetic, electronic, audio frequency or radio frequency or optical markers or devices (or a combination thereof) that are detected by one or more tracking sensors 146 on a over 104. Preferably the path tracking system 110 operates using a two dimensional Cartesian global coordinate system with the Cartesian global coordinate (0, 0) as the start point 118. To track a mover's position within the control area 122 (global coordinate space), one or more path tracking systems 110 can be utilized. For a non-limiting exemplary illustration as shown in FIG. 9, the mover control system 112 receives tracking signals 150 from one or more conventional rotational tracking sensors or encoders 148, such as an optical rotary encoder, that provides outputs (counts) that correspond to or indicates each rotation (angular displacement) of a wheel 152 connected to the mover 104 and riding along the platform of the actual path of travel 108 (FIG. 2).

Figure 10:
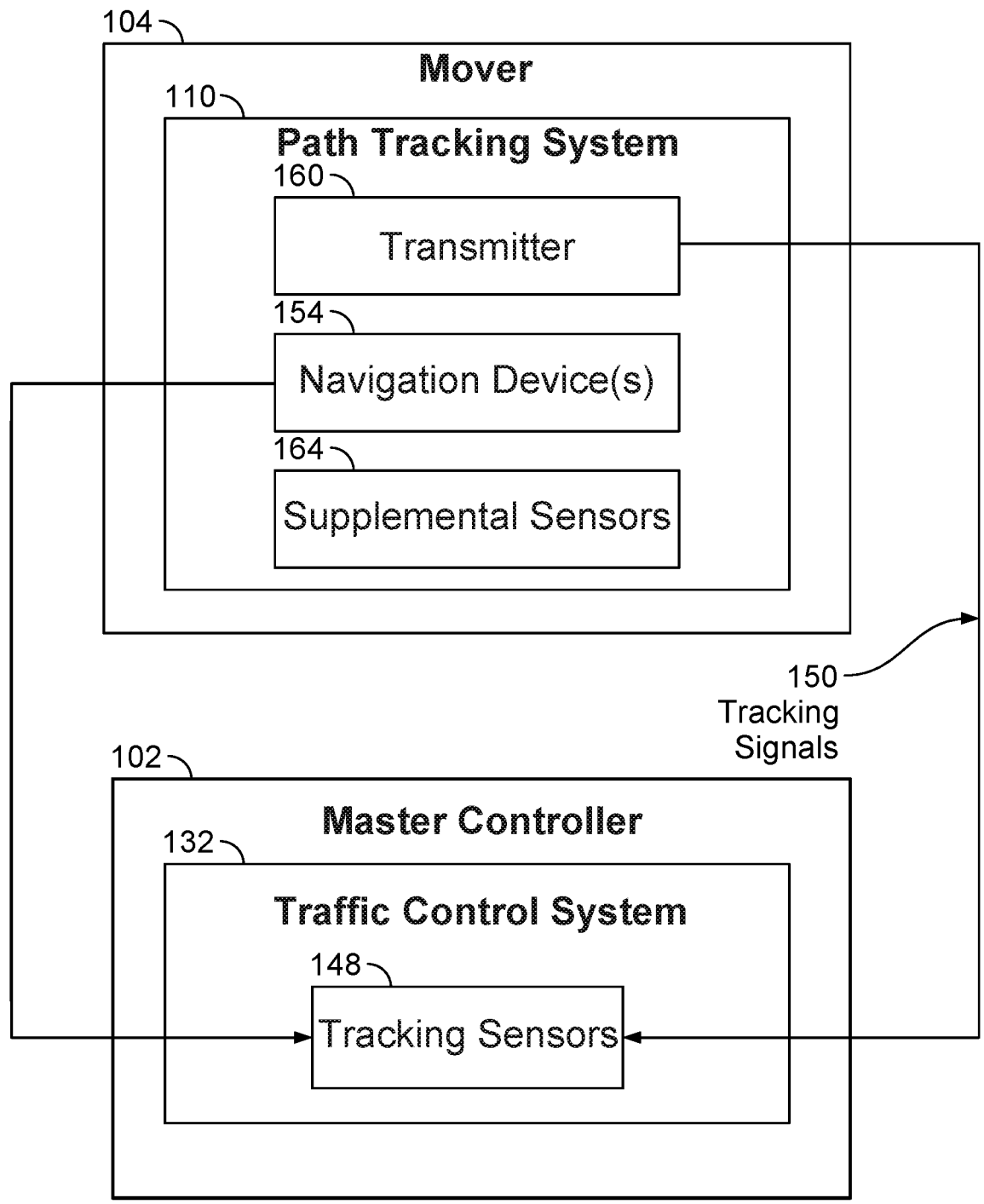
FIG. 10 is a schematic representation of a mover having path tracking system with navigation devices that are detected by tracking sensors for transmitting information to the mover control system and further comprising supplemental sensors.
Figure 11:
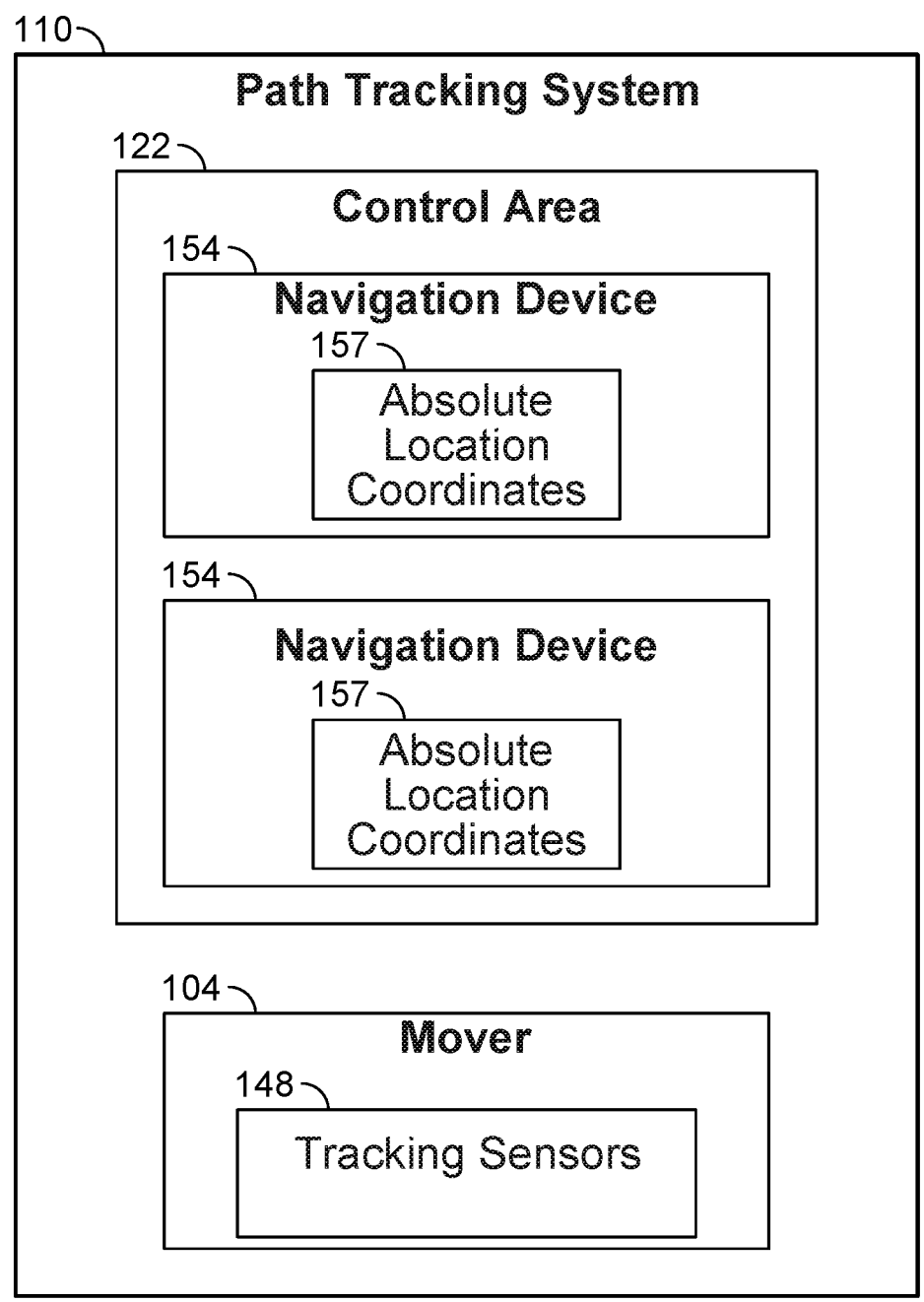
FIG. 11 is a schematic representation showing a mover having a path tracking system having one or more navigation devices with absolute location coordinates and a mover having tracking sensors for detecting the one or more navigation devices.

The mover control system 112 using the tracking signals 150 for each rotation of the wheel 152 together with the circumference of the wheel operates to determine the calculated position 156 (x, y coordinates) of the mover 104 along the predefined virtual vector path 116, in order to compensate or correct for errors, such as errors due to wheel slippage, in a preferred embodiment, as illustrated in FIG. 10, the path tracking system 110 includes a navigation device 154, such as a positional encoding scale and registration marker positioned throughout the control area 122. In operation, tracking sensors 148 on a mover 104 detects the navigation devices 154 and transmits the information to the mover control system 112 which causes the mover control system 112 to determine the mover's actual position 146 and compares the mover's actual position 146 with its calculated position 156 (based on the predefined virtual vector path 116 and the time and estimated speed of travel) (FIG. 3) and operates to adjust the calculated position 154 to correspond to the actual position 146. It should be understood that if the difference between the calculated position and the actual position is outside an acceptable error tolerance in a preferred embodiment of the invention the master controller operates to direct the mover to an alternate end point, such as a maintenance station, or to transmit a notice to be displayed on the HMI, and to direct am alternate mover to replace the mover needing maintenance. It should also be understood that the navigation devices 154 used with the path tracking system 110 can be in the form of various types of markers including visual markers, magnetic markers, electronic markers, physical markers and such markers detectable by the mover's tracking sensors 148. In another preferred embodiment of the invention, the mover control system 112 further operates to compare the actual position 146 to the predefined virtual vector path 116 of the mover 104 and sends control commands 142 (FIGS. 3 and 6) that causes the propulsion system 106 of the mover 104 (or the replacement mover) to adjust the plan parameters 128 (such as to speed up or slow down) of the mover 104 until the mover's actual position 146 aligns with its predefined scheduled position 158 (based on a specific time) along its predefined virtual vector path 116. It should also be understood that the plan parameters 128 and/or the predefined virtual vector path 116 can be adjusted or amended to ensure that the mover arrives at each end point 120 at the scheduled time 159. It should be understood that by continually monitoring the mover's actual position and its predefined scheduled position and adjusting the mover's plan parameters and/or its predefined virtual vector path permits the mover to arrive in a precise position at its end point (within 5 mm and depending on the need for accuracy within 0.5 mm) at its scheduled time.

In another preferred embodiment of the invention, as shown in FIG. 10, the path tracking system 110 is a global position system. Navigation devices 154, such as visual stickers attached to a mover 104, operate such that tracking sensors 148 (or readers), in the form of electronic cameras, communicates with the traffic control system (HTC) 132 of the master controller 102 to identify the mover and the actual position 146 of the mover 104. Another preferred embodiment of the invention, the path tracking system 110 utilizes wireless single strength triangulation such that in operation, a transmitter 160 of the path tracking system 110 mounted to a mover 104 transmits tracking signals 160 along one or more wireless frequency bands and the relative strength of the signals 150 are used to triangulate the mover's actual position 146 within the control area 122. The master controller 102 then operates to determine the actual position 146 of a mover 104 and by comparing or over lapping the mover's actual position 146 with its scheduled position 158 (FIG. 3) along the predefined virtual vector path 116 operates to transmit motion commands 126 to the mover control system 112 directing the propulsion system 106 to change its plan parameters 128 (such as speed or direction of movement) of the mover 104 to ensure that the mover 104 returns to its predetermined scheduled position 158 and continues to follow it predefined virtual vector path 116 (FIG. 9).

Figure 13:
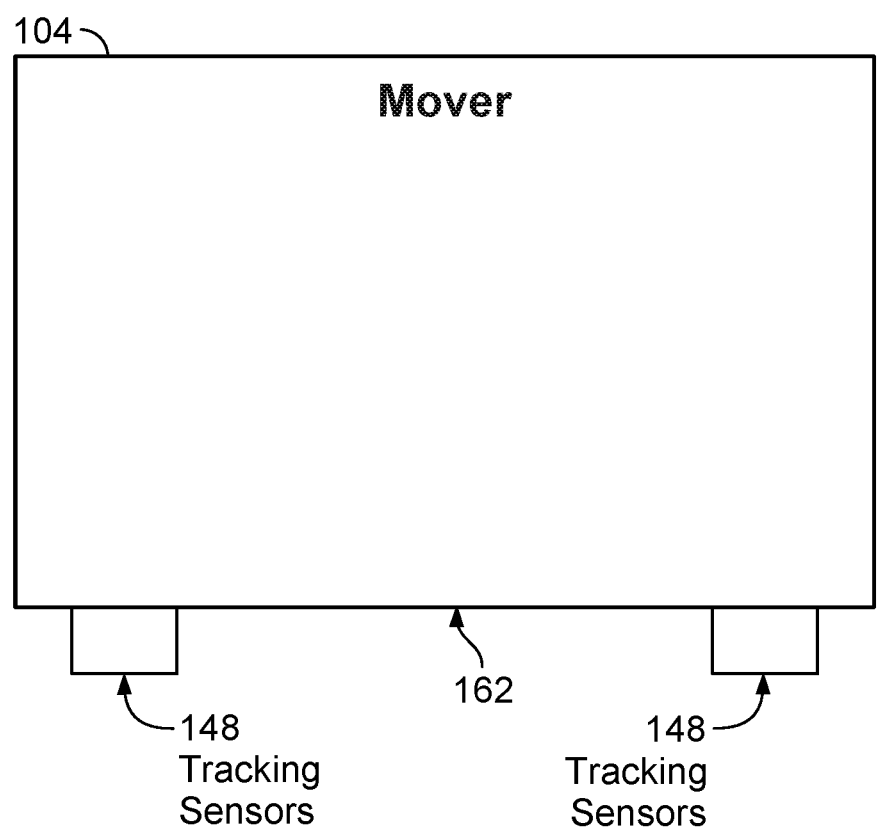
FIG. 13 is a schematic representation of a mover having an undercarriage and one or more tracking sensors positioned thereon.

In another preferred embodiment of the path tracking system 110, the navigation devices 154 are in the form of radio frequency identification (RFID) tags (active or passive) positioned within the control area 122. Each navigation device 154 includes as absolute location coordinates 157 that operate to provide location information to a mover 104 that comes within range to be detected by tracking sensors or readers (antenna) 148 positioned along the undercarriage 162 of the mover 104 (FIG. 13). In operation, as a mover travels near (preferably over) a navigation device 154, the tracking sensors or readers 148 operate to receive the RFID transmission and communicates the RFID location information (coordinates) to the mover control system 112. Preferably, the mover control system 112 transmits the location information in real time through the communication network 114 to the master controller 102.

Figure 12:
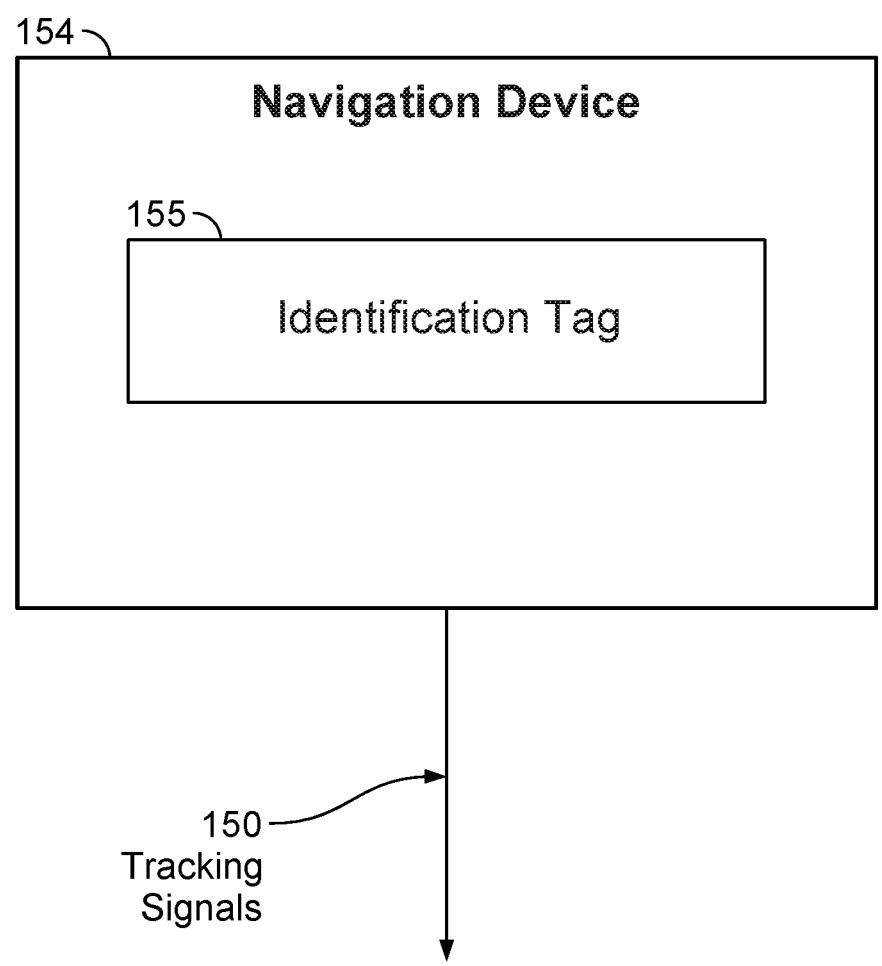
FIG. 12 is a Schematic representation illustrating a navigation device having an identification tag that operates to send tracking signals that can be received by the tracking sensors on a mover.

In another preferred embodiment the navigation devices 154 are positioned within the control area 122 and are in the form of magnetic or inductive markers with a unique identification tag, such as by a RFID tag, that includes the identifier's absolute location coordinates 157 that operate to provide location information to a mover 104 that comes within range and is detected by tracking sensors or readers (antenna) 148 positioned along the undercarriage 162 of the mover 104. Preferably, the tracking sensors 148 are angled magnetoresistive or inductive sensors positioned in a rectangular pattern that operate to indicate the general direction of travel of the mover 104 as well as determining the actual position 146 of the mover 104. For a non-limiting illustration, when a mover traveling along its path moves over a navigation device such that the navigation device is below and preferably between two or more of the tracking sensors positioned along the undercarriage of the mover, together with the identification tag information of the device, permits the mover control system in cooperation with the master controller to accurately determine the actual position (absolute location coordinates) of the mover. It has been surprising found that such a path tracking system permits accurate determination (within 5 mm or less) of the actual position (absolute location coordinates) of the mover at the location of the navigation device. It should be understood that the pattern of the tracking sensors along the undercarriage of the mover permits the determination as to the general direction the navigation device with respect to the mover when in range of the tracking sensors, even when the navigation device is not under the mover. When the mover moves to a location directly above the navigation device so that the device is positioned between two tracking sensors, the mover's incremental measurements can be determined and an accurate position determination (less than about 0.5 mm) can be made and used to adjust the calculated position of the mover to be adjusted thereby correcting for drift by a wheel encoder (tracking sensor) or adjustments to the path followed by the mover. In another preferred embodiment of the invention, as illustrated in FIG. 12, each navigation device 154 includes a unique identification tag 155 that provides absolute identification of the particular device. Preferably, the identification tag 155 is transmitted as part of an RFID transmission (tracking signals 150) but it should be understood that the identification can be in the form of a visual or other perceived form. By positioning navigation devices at predetermined sensor range distances, the mover's position relative to the device within the sensor range can be determined. The mover control system 112 can then operate to direct the mover's propulsion system 106 to move the mover 104 such that at least two of the tracking sensors 148 are above and between the navigation device 154 providing a precise and accurate, actual position 146 of the mover 104. It should be understood that when an navigation device is placed in the control area its global position coordinates are entered into the master controller, such as by use of the HMI, and is used as part of the predefine virtual vector path planning for the movers operating in the mover system. It should further be understood that by placing a sufficient number of navigation devices within the control area or platform, the master controller can periodically compare a mover's calculated position and/or scheduled position with its actual position thereby correcting any inaccuracy in the calculated position (such as caused by errors in the incremental wheel encoder or wheel slippage) as well as adjusting the mover's path parameters and/or predefined virtual path to ensure that the mover's actual position is synchronize with the mover's scheduled position. It has been found that position that by using the described path tracking system accuracy of less than about 0.5 mm can be achieved.

In another preferred embodiment, to further improve the position accuracy of a mover, the path tracking system includes supplemental tracking sensors 164, such as gyroscopic and/or accelerometer sensors. In operation, the supplemental tracking sensors 164 (such as gyroscopic sensor) operate to track the general direction of a mover 104 and the mover control system 112 operates to compare the general direction of the mover 104 with direction information obtained from other tracking sensors 148 (such as from wheel encoders) to provide an estimation as to wheel slippage. In another preferred embodiment, the supplemental tracking sensors 164 (such as an accelerometer sensor) operate to determine acceleration of the mover. For a non-limiting exemplary illustration, if a mover was traveling at a constant velocity and contacts an oily spot on the platform such that wheel on the mover begins to slip, the tracking sensor, such as a wheel encoder, may inaccurately record an increase in the mover's velocity due to less surface resistance on the wheels. However, the secondary tracking sensor would indicate a sudden deceleration which would be used by the mover control system and the master controller to correct the information from the tracking sensor (encoder).

It should now be apparent that the path tracking system of the mover system operates to identify specific locations along the predefined virtual vector path. Preferably, the path tracking system has one or more navigation devices that operate to provide information to the mover control system for use in calculating the actual position of the mover. The mover control system (or the master controller) further operates to compare the calculated position with the actual position and to correct the calculated position so that it matches the actual position of the mover. It should be understood that if the difference between the calculated position and the actual position is outside a predefined tolerance, the master controller transmits a notice to the HMI that the mover may be experiencing electrical or mechanical errors. It should also be understood that the mover control system (or the master controller) further operates to compare the actual position with the scheduled position and if the difference is outside a predefined tolerance, the master controller transits a notice to the HMI that the mover may be in need of maintenance. Further, in a preferred embodiment the mover control system operates to modify the predefined virtual vector path or create a new predefined virtual vector path or operates to adjust the plan parameters so that the mover arrives at the end point(s) at its scheduled time.

Propulsion Systems

Figure 14:
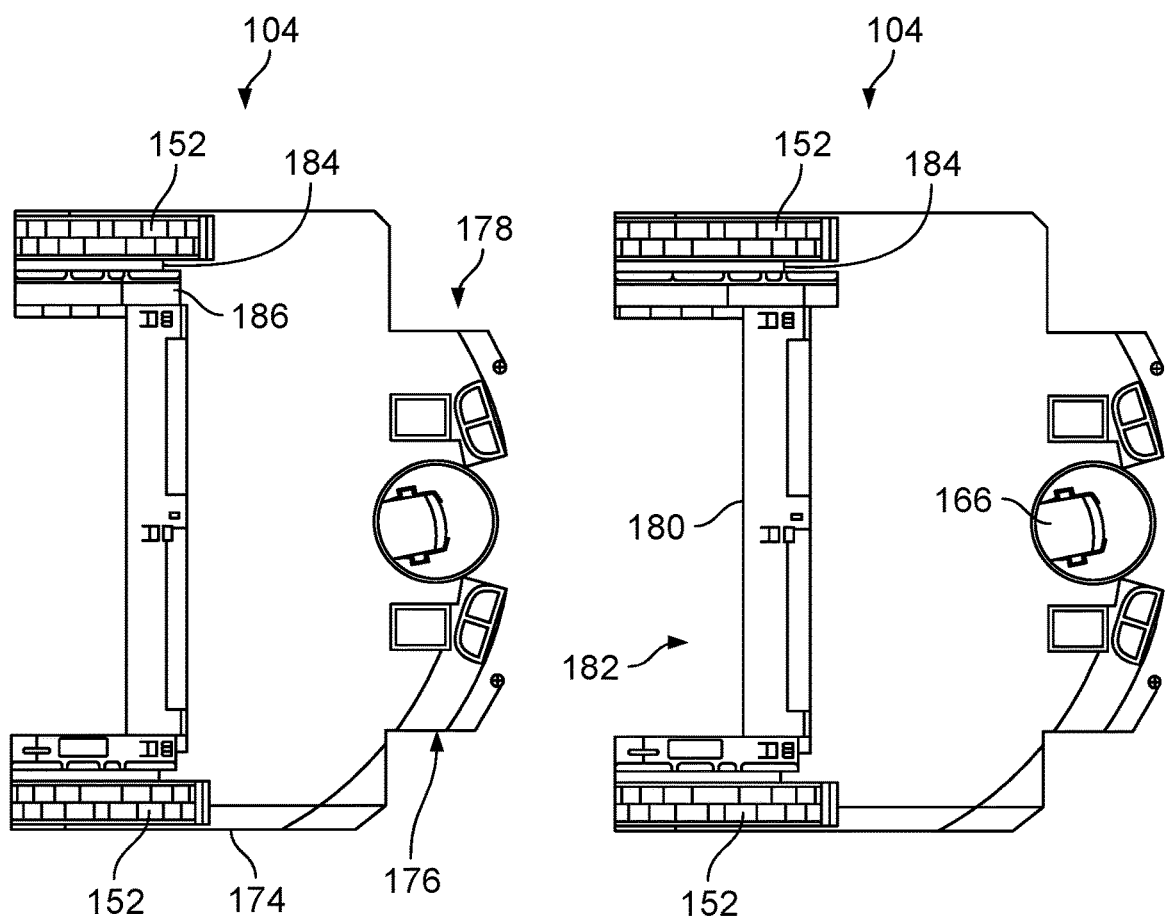
FIG. 14 is a schematic representation of a preferred embodiment of a pair of movers each comprising a pair of coaxially aligned wheels, at least one steering wheel, and a propulsion system having a battery that operates to energize one or more electric propulsion motors for driving coaxially aligned wheels.
Figure 15:
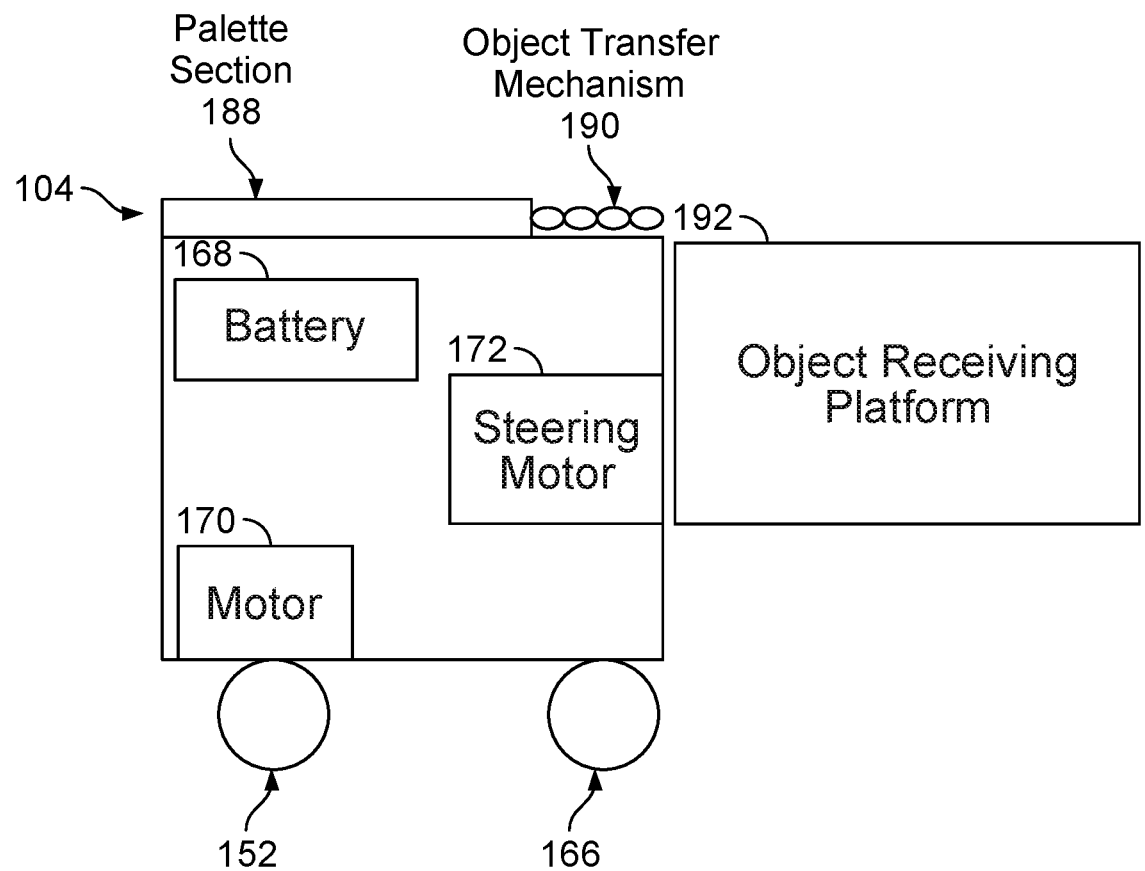
FIG. 15 is a schematic representation of a side view of a mover having a palette section for supporting an object and an object transfer mechanism for transferring the object from/onto the palette section to/from an object receiving platform for loading and/or unloading one or more objects at an end point.

In a preferred embodiment of the invention, as illustrated in FIGS. 14 and 15, the movers 104 comprise a pair of coaxially aligned wheels 152 and at least one steering wheel 166. It should be understood that a mover 104 can have three or more wheels depending the size of the mover and the weight of the object being transported and the number of wheels necessary to provide stability to the mover when transporting the object. Preferably, propulsion system 106 of the mover 104 includes a battery 168 that operates to energize one or more electric propulsion motors 170 for driving coaxially aligned wheels 152. It should be understood that in certain preferred embodiments of the invention the battery could be replaced by transmitting electrical current such as by the mover electrically contacting electrical tracks mounted along the path for supplying power to the various systems mounted to the mover. Preferably, the wheels are formed having rubberized, vinyl or plastic tread bands thereon to minimize vibration and wheel slippage during travel. The propulsion system 106 further includes an electric steering motor 172 that is mechanically coupled to the steering wheel 166 and operates to navigate the mover 104 by rotate the steering wheel 166. In another preferred embodiment, the steering wheel 166 is a freely rotating wheel. In operation, the electric propulsion motors 170 operate to rotate the coaxially aligned wheels 152 by different amounts to cause angular displacement and change in direction of travel of the mover 104. In a preferred embodiment, by operating each of the electric propulsion motors 170 independently forward and backwards at variable speeds, the mover can travel in both the x and y directions. In a preferred embodiment, each mover 104 further includes a plastic or metal cover 174 with a front end 176 having a lower in height and a bumper assembly 178 protruding outwardly and a back end 180 having an indented section 182 with a configuration such that it can mate with the bumper assembly of another mover thereby allowing multiple movers to fit together to achieve a smaller product pitch then the movers real in-nested length while maintaining mover stability.

In a preferred embodiment, the plastic or metal cover or encasement 174 is a washed down rated plastic or metal removably or permanently positioned around the mover 104 such that protects or shelters the mover's electronics and electric propulsion and steering motors during washing and cleaning of the mover. It should be understood that since the movers operate using a wireless command system, the only openings in the cover 174 that are required are the openings 184 for the wheel axles 184 which can be protected using non-water permeable rubber gaskets (not shown) or the like to prevent water leakage through such openings 184.

Referring to FIG. 15, each mover includes a palette section 188 for support an object thereon and an object transfer mechanism 180 for transferring the object from the palette section 188 to an object receiving platform 192 at a loading and/or unloading station (end point) 120. It should be understood that such object transfer mechanism 190 can be a conventional mechanism such as pallet rollers or bearings spaced across the surface 194 of the palette section 188 permitting easy horizontal of an object resting on the palette section 188 such that the object transfer mechanism 190, such as an arm assembly, hydraulic system, chain system, robotic arm system, and the like operates to transfer the object from the palette section 188 to the object receiving platform 192. In another preferred embodiment the object transfer mechanism 190 is a lifting mechanism that lifts one end of the palette section 188 upwardly so that the object resting on the palette section 188 slides forwardly towards the object receiving platform 192.

Figure 16:
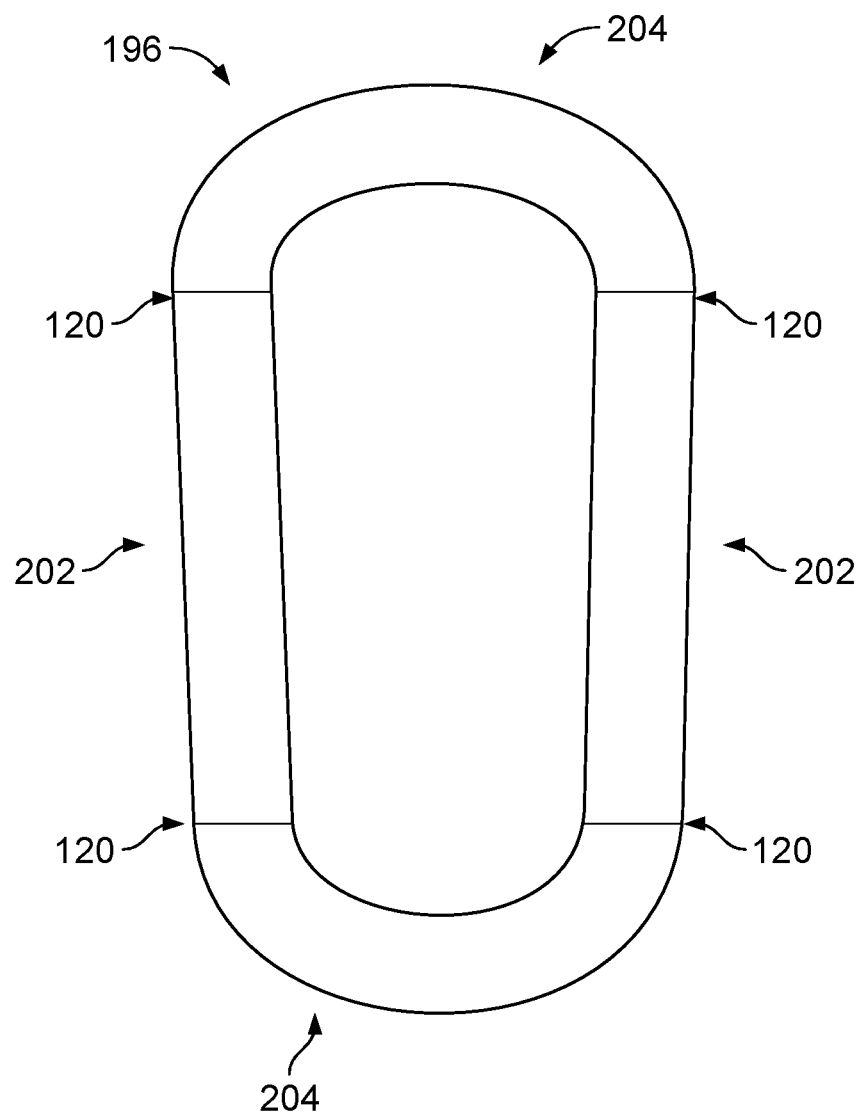
FIG. 16 is a schematic representation of another preferred embodiment of the invention showing a track having one or more curved sections and one or more curved sections.
Figure 17:
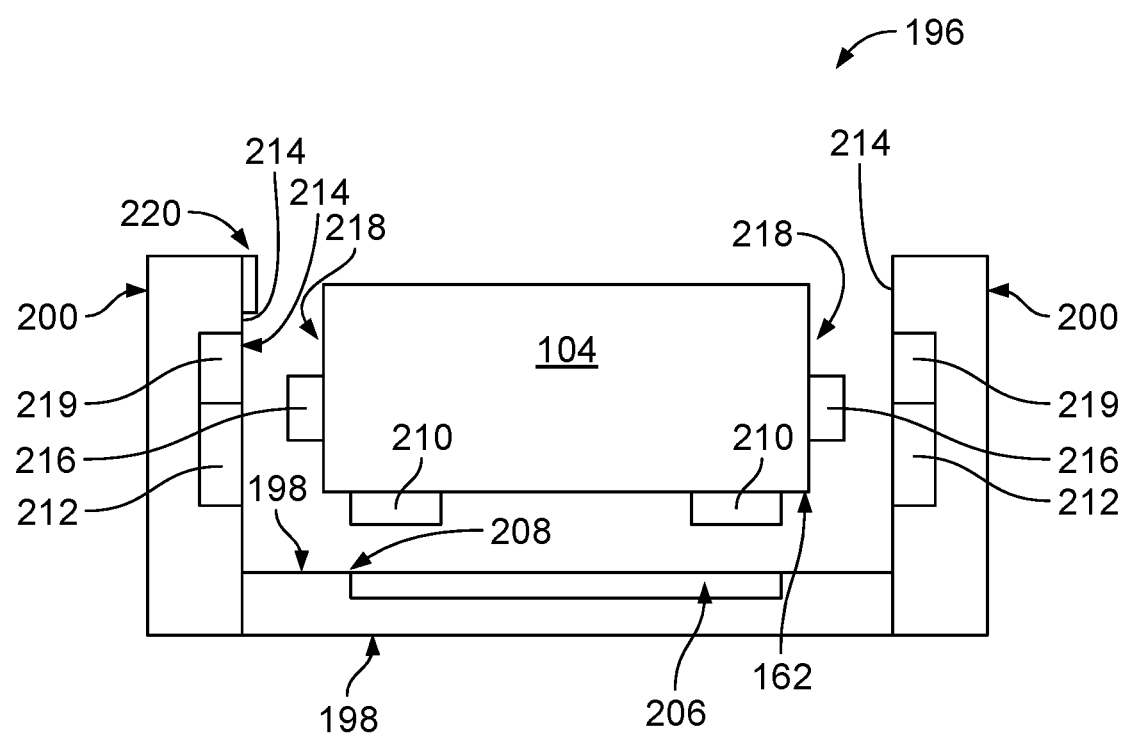
FIG. 17 is a schematic representation of another preferred embodiment of a mover system of the subject invention showing a track having a bottom wall, parallel side walls, and a propulsion system having electromagnetic levitation coils for levitating a mover and a plurality of electromagnetic propulsion coils for moving a mover along its predefined virtual path (track)
Figure 18:
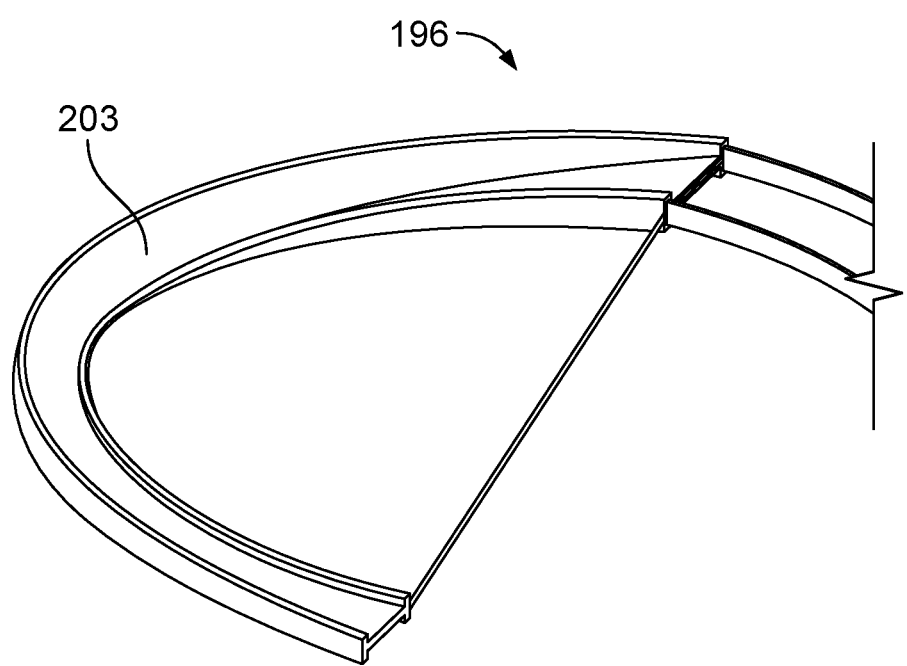
FIG. 18 is a schematic representation showing another preferred embodiment of the invention showing a portion of the track having banking.

In another preferred embodiment of the invention, as illustrated in FIGS. 16 and 17, the mover system 100 includes a track 196 having a general U-shape configuration with a bottom wall 198 and a pair of parallel side walls 200 extending perpendicularly upwardly from the bottom wall 198. Preferably, the track is formed from steel or other magnetic conducting materiel having one or more generally straight sections 202 and one or more curved sections 204 creating a closed loop track having a start point 118 for use by the master controller 102 to coordinate the location of a mover 104 along the track 196 and one or more end points 120. In another preferred embodiment if a mover is operating along a predefined platform the curve sections 204 are in the form of clothoid arcs, which includes banking 203 (FIG. 18) along the outside of the track 196 that operates to reduce wheel slippage and/or to reduce the effects of centripetal force acting on the mover. In another preferred embodiment, the curved sections 204 are in the form of clothoid or approximate clothoid arcs for minimizing any abrupt variations in curvature that can cause variation in centripetal force acting on the mover as it travels along the track it should be understood that the track 196 can further include one or more side paths 124 (FIG. 2). As shown in FIG. 17, the propulsion system 106 includes at least one electromagnetic levitation coil 206 mounted to the inner surface 208 of the bottom wall 198 of the track 196 that is effective for creating an electromagnetic field, and one or more magnets 210 mounted to the undercarriage 162 of each mover 104. Once energized, the electromagnetic levitation coil 206 generates an electromagnetic field that provides a repelling force against the electromagnetic fields created by the one or more magnets 210 allowing the mover 104 to levitate above the bottom wall 188 of the track 196. In another preferred embodiment, the propulsion system 108 further comprises a plurality of electromagnetic propulsion coils 212 effective for creating electromagnetic fields mounted along the inner surfaces 214 of the parallel side walls 200. The electric current energizing the electromagnetic propulsion coils 212 is constantly alternating to change the polarity of the magnetized propulsion coils 212 that reacts with magnetic fields created by propulsion magnets 216 mounted along the sides 218 of each mover 104 to create forward or backward motion of the movers 104. In order to reduce the likelihood of a mover 104 contacting the track 196, a plurality of side electromagnetic levitation coils 219 and a plurality of proximity and speed sensors 220 are placed along the side was 200 of the track 196 which electronically communicates with the master controller 102 that operates to continuously adjust the energizing voltage to the one or more electromagnetic levitation coils 219 to correct the position of the mover 104 so that it maintains its proper distance from the side ways 200 of the track 196 thereby preventing a mover from contacting a side wall during operation. In a preferred embodiment of the invention, tracking sensors 148 are positioned along the track 196 and each are electronically coupled to the master controller 102 and operate to accurately update the position of the mover 104 at any know point along the track 196 thus verifying the actual position 146 of each mover 104 traveling along the track 196. It should now be apparent to one skilled in the art that control tracking sensors 148, such as visual cameras, allow for a relatively inexpensive way to resynchronize a mover 104 traveling along the track 196.

In another preferred embodiment of the invention the master controller 102 operates to adjust the energizing of the electric propulsion coils 212 to change the plan parameters 128 of the movers 104 such that the movers arrive at their scheduled end points 120 at the their scheduled times. Further, it should now be apparent that changing the plan parameters 128 of the movers 104 can be used to increase or decrease the pitch between movers 104 as they travel along the track 196. In an exemplary illustration, by reducing the speed of a first mover relative to the speed of a second mover that is traveling ahead or behind the first mover will result in increasing the pitch or distance between the two movers. It should be understood that the master controller further operates to monitor the positions and speeds of each mover traveling along the track and adjusts the speed of the movers to maintain their relative positions to each other in accordance with the predefine virtual path and plan parameters. It should also be understood that in a preferred embodiment of the invention the motion controller operates by adjusting the plan parameters of a mover as it travels along from one end point to another along the track to ensure that the mover arrives at a defined end point at its scheduled time.

Figure 19:
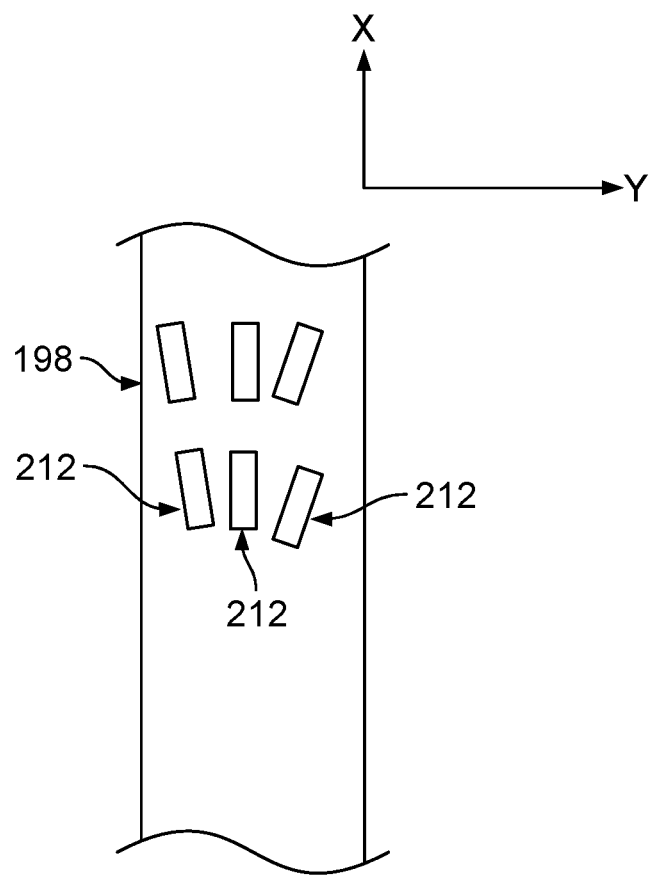
FIG. 19 is a schematic representation of another preferred embodiment of the mover system showing the propulsion system having a plurality of propulsion coils and/or levitation coils arranged along the bottom wall of the track that operate to impart x and y movement of the mover.
Figure 20:
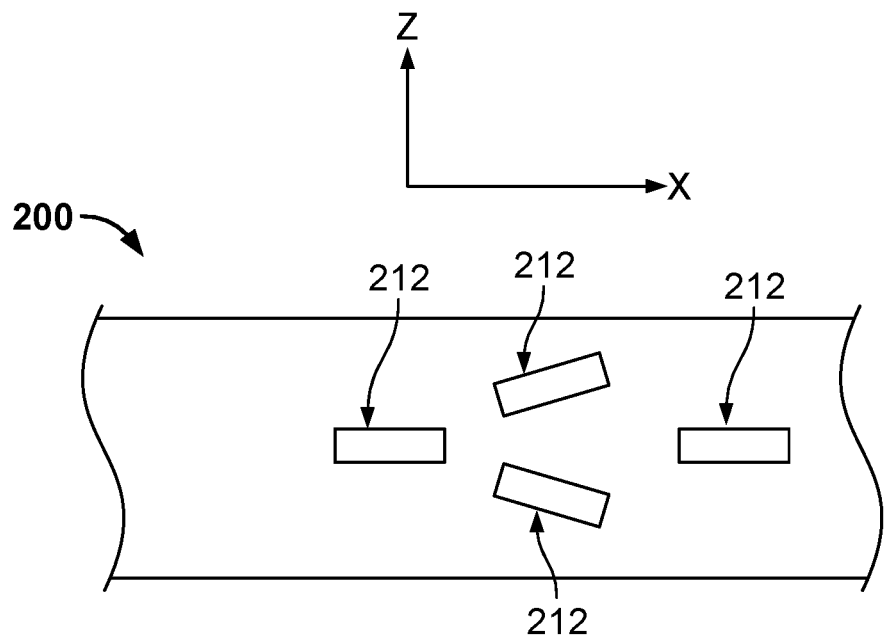
FIG. 20 is a schematic representation of another preferred embodiment of the mover system showing the propulsion system having a plurality of propulsion coils and/or levitation coils arranged along the side walls of the track that operate to part x and z movement of the mover.

In another preferred embodiment of the invention, as illustrated in FIGS. 19 and 20, the bottom wall 198 and side walls 200 of the track 196 are provided with propulsion coils 212 that cooperate with magnets 210 on the undercarriage 162 and/or sides 218 of the mover. It should be understood that propulsion coils 212 can be arranged along the bottom wall 198 of the track 196 in both the x and y directions that operate to direct a mover 104 in both x and y directions along their predefined virtual vector path 116 along the track 196 and/or along the side walls 200 in both the x and z directions that operate to direct the mover 104 in both x and z directions. Preferably, magnets 210 and 216 are arranged in a conventional alternating north and south pole arrangement using bearings or sliding self-lubricating plastic between the mover and the bottom wall 198 of the track 196. In another preferred embodiment the magnets mounted along the undercarriage 162 of the mover 104 are in a conventional Halbach array pole arrangement that operates to levitate and create movement of the mover 104 during operation. Preferably, the propulsion coils are sized and pieced so there are at least six coils that operate together to affect motion of a mover in both the x end y directions and/or the x and z directions. In another preferred embodiment tracking sensors 148 are positioned along the track 196 and are electronically coupled to the master controller 102 to operate to accurately update the position of the mover 104 at any know point along the track 196 thereby verifying the actual position 146 of each mover 104 traveling along the track 196. The individual propulsion coils 212 can then be energized or de-energized to adjust the x and y direction of movement as well as the plan parameters 128 for the mover to ensure that the mover arrives at the scheduled end point 120 at its scheduled time. While the use of levitation and propulsion coils have been described along the bottom end/or sides of the track and levitation and propulsion magnets have been described as being mounted on a mover, it should be understood that in another preferred embodiment the levitation and propulsion coils can be position on the mover and the levitation and propulsion magnets can be mounted along the bottom wall and/or the side walls of the track.

Figure 21:
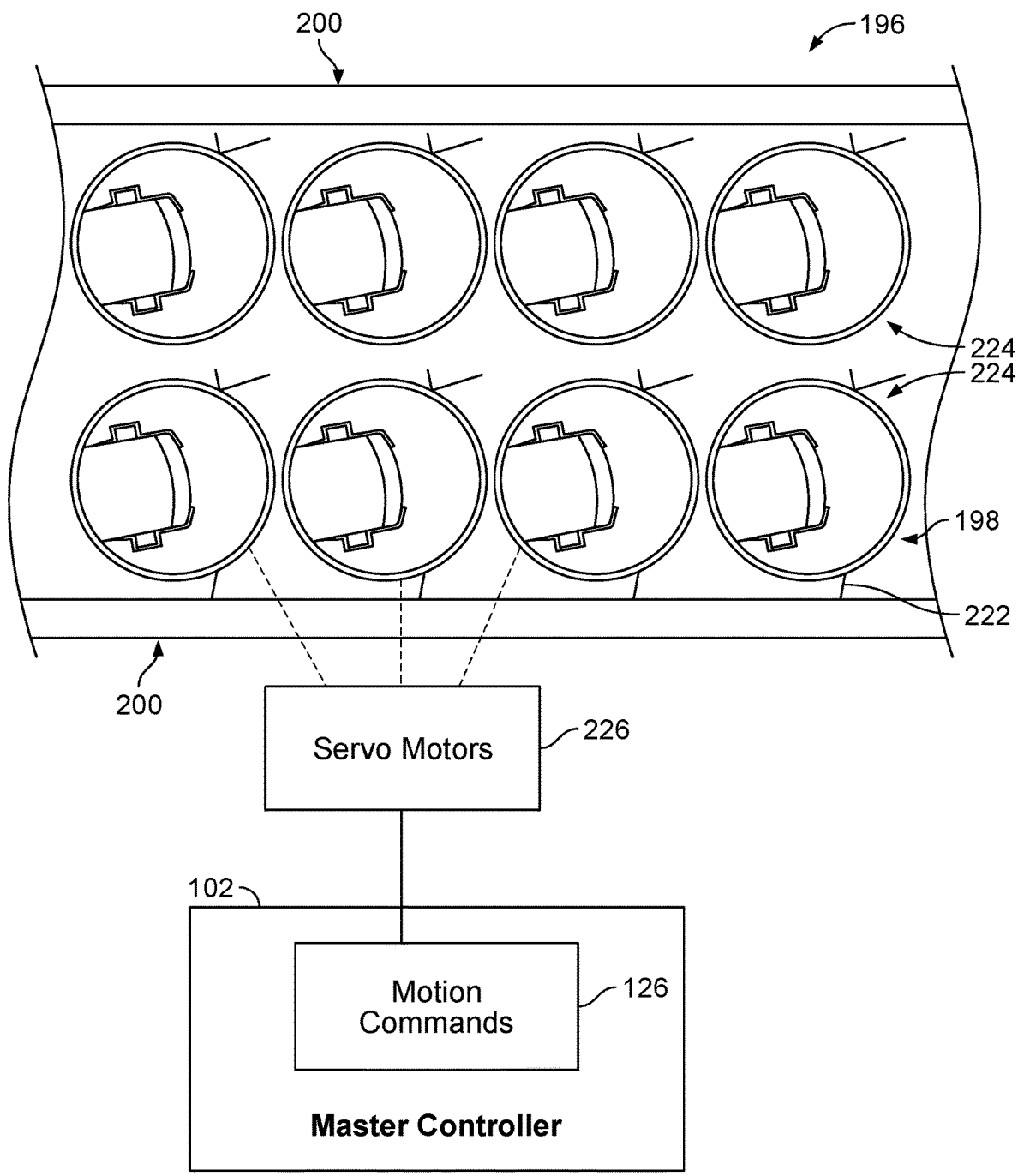
FIG. 21 is a schematic representation of another preferred embodiment of the mover system of the subject invention showing a track having a plurality of swiveling wheels each mounted to a pair of rotary servomotors that cooperate together to create a conveyor for supporting a mover and for moving a mover in both the x and y directions.

Referring to FIG. 21, another preferred embodiment of the moving system of the subject invention is shown having a track 196 having a bottom wall 198 and parallel side walls 200 extending perpendicular upwardly from the bottom wall 198. Positioned along the upper surface 222 of the bottom wall 198 is a plurality or rollers (or castor wheels) 224 for supporting a mover 104 thereon. Each roller 224 is swiveled mounted to the bottom wall 198 and each connected to a pair of motorized rotary servomotors 226. One servomotor 226 operates to control the angle of the roller 224 and the other rotary servomotor 226 operates to drive (rotate) the roller 224. In operation, the master controller 102 functions to direct a mover 104 along its predefined virtual vector path 116 by transmitting motion commands 126 to the servomotors 226 such that the servomotors 226 change the angle of the rollers 224 when supporting a mover 104 and the rotational speeds of the rollers 224 to direct the mover traveling along the track 196 to its proper end point 120 at its scheduled time. It should be understood that in the event a mover is ahead of schedule or behind schedule the master controller 102 can transmit motion commands 126 to change the mover's plan parameters 128 to ensure that the mover arrives at its end point at the proper scheduled time. In order to maintain stability of the mover, preferably the mover has a relatively square bottom configuration and the rollers are sized so that at least four rollers are positioned constantly underneath the mover as it travels along the track. Preferably, the rollers are arrange as a two by two square and spaced at a minimum of one half the width and length measurement of the mover. If two movers share a same roller, the movers are separated by driving the other rollers underneath the movers while not driving the shared roller thereby causing the movers to slip or slide off the shared roller. In a preferred embodiment, the rollers are formed from steel conveyor rollers and the undercarriage 162 of the movers 104 are be made of rubber or a soft sanitary plastic that passes wash down requirements. In another preferred embodiment, the undercarriage 162 of the movers 104 is formed from a wearable material which can be easily replaced.

In another preferred embodiment of the invention the master controller 102 further operates to determine the difference between the actual position 146 of a mover 104 and its scheduled position 158 along the mover's predefined virtual vector path 116 and uses the comparison to determine the probability that one or more of the wearable parts on the mover needs replacement. For a non-limiting example, if a mover is traveling slower than the scheduled speed at a discrete point along the predefined virtual path, the master controller automatically sends a notice for display on the human-machine-interface that the mover is in need of servicing.

Figure 22:
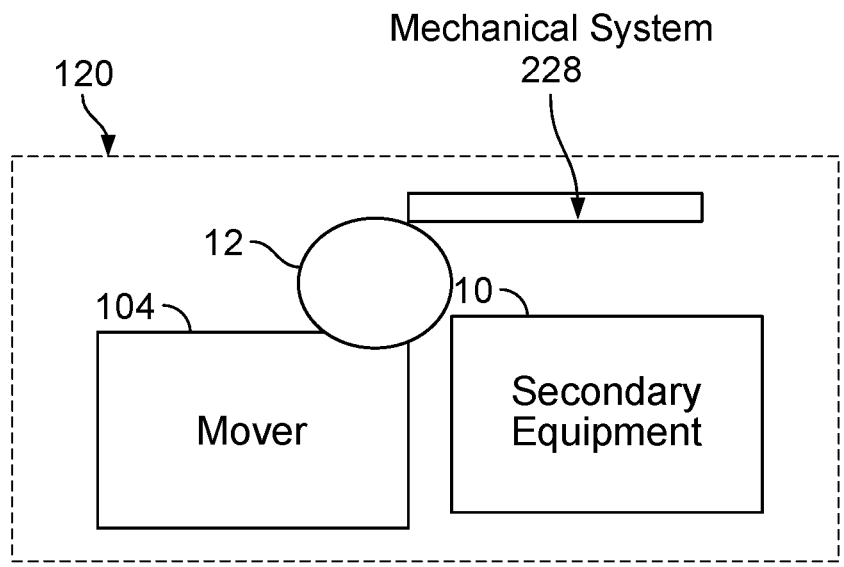
FIG. 22 is a schematic representation of another preferred embodiment of the invention showing a mover having an object thereon at a scheduled end point having secondary equipment and a mechanical system for securing the position of the mover and/or an object when it arrives at an end point.
Figure 23:
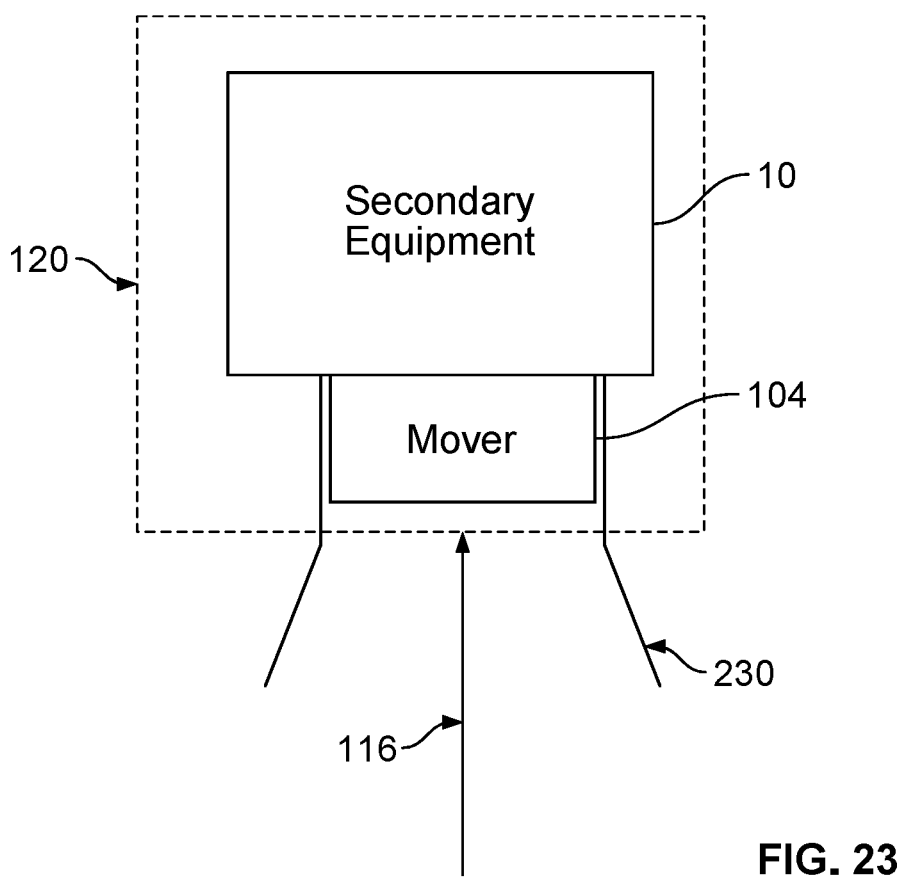
FIG. 23 is a schematic representation of another preferred embodiment of the invention showing a mover positioning apparatus, such as guides, for guiding a mover into precise position at an end point.

In a preferred embodiment, as illustrated in FIG. 22, the mover system 100 further includes one or more convention mechanical systems 228 for securing the position of a mover 104 and/or an object 12 when it arrives at an end point 120. The mechanical systems 228 operate to minimize any movement of the object as it receives an operation (such as a mechanical manufacturing operation) thereon. In another preferred embodiment, as illustrated in FIG. 23, the mover system 100 includes mover positioning apparatus 230, such as guide rails, that operate to guide a mover 104 as it approaches an end point 120 so that the mover, or an object thereon, is precisely aligned with the secondary equipment 10 at the end point 120.

In another preferred embodiment of the invention, as illustrated in FIG. 2, the predefined virtual vector path 116 is defined such that a mover 104 is directed to a battery charging station 232 that operates to allow a mover to exchange a discharged battery on the mover for a charged battery stored at the battery charging station. In another preferred embodiment the battery and the battery charging station operate, such as through induction, whereby the batter charging station includes induction coils 234 that operate to charge a battery 168 (FIG. 15) as it travels along its path 108 and past the induction coils 234. It should be understood that the battery charging station 232 can be positioned along the path 108 traveled by a mover 104, such as for a mover system where the movers travel a routine path (constant predefined virtual paths) or can be located along a side path 124. For a non-limiting illustration, during operation when a battery on a mover indicates, such as by a meter or charging is determined by prescheduled schedule, the master controller or the movers control system operates to direct the mover to a battery charging station. If in the event the master controller and/or the mover's control system operates to determine that the charging or replacement of the batter will impact the time that the mover will reach an end point, the master controller and/or mover's control system operates to adjust, modify or creates a new predefined virtual vector path and/or operates to adjust the plan parameters to ensure that the mover arrives at the end point at its scheduled time. It should now be understood that by mounting a battery along the side or near the undercarriage of the mover permits the battery to be charged as the mover travels in close proximately to the charging station. In another preferred embodiment, the charging station can include contacts 235 that contact the mover as it travels past the charging station such that it provides electrical current to charge the battery on the mover. It should be understood that the number of charging stations is dependent on the size of the battery to be charged, battery usage, the amount of time that the mover is in close proximity (as well as how close of proximity, such as to an induction coil) or in contact with the charging station.

Figure 24:
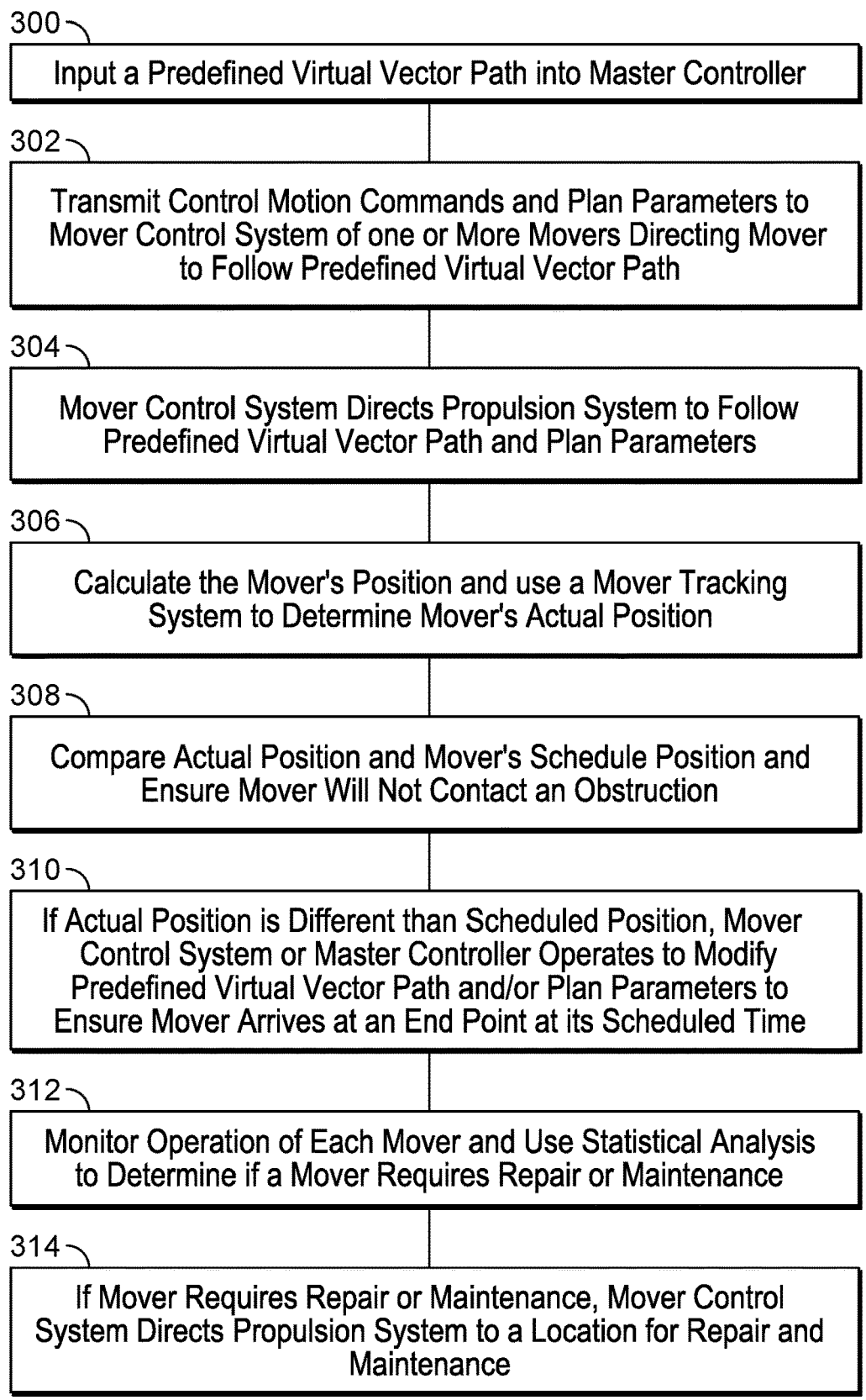
FIG. 24 is a flow diagram illustrating the communication network and the control systems of the subject invention for directing a mover along a predefined virtual path and for amending the path and/or the plan parameters of the mover for directing a mover to an end point at a scheduled time.

In operation, as illustrated in FIG. 24, a predefined virtual vector path having a start point and one or more end points for a mover is inputted into the master controller (step 300). Preferably, one such method uses conventional software visualization whereby an operator inputs control information, such as by use of the human-machine-interface. The master controller transmits through a communication network control motion commands and plan parameters to the mover control system (step 302) for following the predefined virtual vector path. In a preferred embodiment the operator utilizes a global coordinate bounding box (control area) whereby the 0, 0 (x, y coordinates) is defined as the start point and a vector path (predefined virtual vector path) is drawn (defined) as a closed loop within the bounding box. Convention control software, such as Allen Bradley Logix software, Siemens Simotion software, Beckhoff Twincat software, and the like, is then used to create mover motion commands that are used to direct the movers propulsion system to follow the predefined virtual vector path (step 304). In another preferred embodiment the vector path (predefined virtual vector path) is inputted into the mover control system using conventional hardware training systems whereby sensing hardware capable of tracking its location within a control area is moved along a path and its movement (position) is continuously tracked, recorded and used to conventionally create a predefined virtual vector path. It should be understood however that other systems can be utilized to create predefined virtual vector paths, such as a hybrid method whereby a base virtual vector path, such as a simple oval, is created using conventional software visualization system and small sections of the path is modified, such as by use of a conventional hardware training system. It should also be understood that a virtual vector path may also require optimization, adjustment or precision guidance, such as by a programmer making adjustments to the predefined virtual vector path, to ensure a mover is properly aligned upon arrival at a particular work station (end point).

During operation, the master controller receives information from the path tracking system for each mover and the various detection systems and calculates and/or monitors the actual positions of each mover (step 306). The traffic control system of the master controller continuously operates to compares each movers actual position with its scheduled position to ensure that a mover does not contact (collide) with an obstruction or another mover as they move along their predefined virtual vector paths (step 308). If a mover's actual position is different than its scheduled position, it utilizes standard proportional, integral, derivative (PID) control loop theory to produce corrective velocity commands (or path alterations) which are transmitted to the mover's control system which operates to forward the commands to the mover's propulsion system (step 310). In another preferred embodiment of the invention the master controller operates to monitor the operation of each mover and uses statistical an to determine if a mover is requiring repair or maintenance (step 312) and if so operates to transmit control commands to the mover control system and cooperates with the mover control system provide mover control commands to the mover's propulsion system to direct the mover to a location for the repairs or maintenance (step 314). The master controller further operates to select another mover and provides the mover's control systems with control commands and plan parameters to replace the mover being repaired or requiring maintenance. In this way, the system for transporting objects can operate without alteration or interruption. For a non-limiting exemplary illustration, as the speed of the various over all assembly or operation (master axis) being serviced by the system for transporting objects of the subject application increases, the speed of operation of the individual components of the master axis can increase. As the speed of the master axis slows down or stops, the system for transporting object can slow down or stop. Thus, the overall operation of the master axis can remain synchronized.

It should now be apparent that the subject invention is a new and novel mover system for transporting object having a plurality of independently controlled autonomous movers operating along an adjustable predefined virtual vector path, that allows an operator to easily modify the path of one or more of the movers, that operates to modify the movement (path parameters and path of travel) of each mover to ensure that each mover arrives at a predetermined end point (destination) at a predetermined specified time. Each mover includes a tracking system that provide absolute location coordinates and a mover control system that transmits the mover's position to a master controller. In another preferred embodiment the mover system includes one or more detection systems that cooperate with the tracking system to ensure that the mover does not contact (collide) with an obstruction or another mover. Accordingly, the master physical or virtual axis of an industrial operation can be synchronized with the mover system.

It should also now be apparent that the mover system of the subject invention provides a new and novel system whereby independent movers can operate along predefined virtual vector paths and arrive precisely at an end point to position an object being transported thereon to be in proposition for loading, unloading or having an operation performed thereon. It should also apparent that the mover system of the subject invention operates such that an interruption in a mover's travel is automatically compensated for, such as by adjusting or modifying the mover's predefined virtual vector path and/or plan parameters, such that the mover arrives at its end point and its scheduled time. Further, the system operates such that each mover is monitored and analyzed to determine if the mover requires maintenance, and if so, the system automatically operates to notify an operator, such as by way of a HMI, or automatically operates to direct the mover along an alternative path for maintenance. The system further operates to direct a new mover along a predefined virtual vector path under appropriate plan parameters so that the new mover arrives at the old mover's end point at the scheduled time. Thus, the mover system operates to minimize interruption of the system caused by mover maintenance requirements. Further, by use of battery charging stations positioned within the control area or path of travel of the movers, the mover can operate continuously without the need of stoppage for batter charging or replacement. Thus, in view of the foregoing, it should now be apparent that the subject invention provides a mover system that permits one or more movers to operate independently along predefined virtual vector paths to arrive at one or more endpoints at scheduled times and minimizes interruptions.

The invention claimed is:

1. A mover system for transporting objects from a start point to an end point, the mover system comprising:
   a plurality of rollers for supporting a mover thereon, wherein each roller is coupled to at least one motorized rotary servomotor that operates to drive said roller to move said mover such that it follows a predefined path; and
   a master controller that operates to transmit motion commands to said servomotors,
   wherein said master controller further operates to determine a calculated position of said mover and transmits motion commands that modify the operation of said at least one motorized rotary servomotors to move said mover so that said calculated position matches a scheduled position for said mover.

2. The mover system of claim 1 wherein said master controller operates to periodically adjust plan parameters so that said mover arrives at the end point at a selected time.

3. The mover system of claim 1 wherein said master controller operates such that the mover system is synchronized with operation of secondary equipment operating in conjunction with the mover system.

4. The mover system of claim 1 wherein said at least one motorized rotary servomotor further operates to control an angle of said roller.

5. The mover system of claim 1 further comprising a path tracking system that operates to identify specific locations along said predefined path.

6. A mover system for transporting an object from a start point to an end point, the mover system comprising:
   a plurality of rollers for transporting the object along a predefined path, wherein each roller is coupled to at least one servomotor that operates to drive said roller; and
   a master controller that operates to transmit motion commands to said at least one servomotor,
   wherein said master controller further operates to monitor the position of the object and determines if the object will arrive at the end point at a scheduled time and if not said master controller operates to transmit motion commands to adjust said at least one servomotor such that the object arrives at said end point at said scheduled time.

7. The mover system of claim 6 wherein said plurality of rollers are in a form of wheels.

8. The mover system of claim 6 wherein said at least one servomotor operates to drive a wheel and control wheel angle.

9. The mover system of claim 6 wherein said plurality of rollers operate to rotate and swivel to direct the object in a desired direction and speed.

10. The mover system of claim 6 wherein said plurality of rollers are arranged as a two by two square.

11. The mover system of claim 6 wherein said plurality of rollers are arranged such that at least four rollers are constantly positioned under the object.

12. The mover system of claim 6 wherein said master controller operates to monitor a location of the object and adjust plan parameters of one or more of said plurality of rollers so that the object arrives at the end point at said scheduled time.

13. The mover system of claim 6 wherein at least one said at least one servomotor drives two or more said rollers.

* * * * *

UNITED STATES PATENT AND TRADEMARK OFFICE
CERTIFICATE OF CORRECTION

PATENT NO. : 10,795,368 B2  
APPLICATION NO. : 16/120839  
DATED : October 6, 2020  
INVENTOR(S) : Glen C. Wernersbach Page 1 of 3

It is certified that error appears in the above-identified patent and that said Letters Patent is hereby corrected as shown below:

In the Specification

In Column 1, Line(s) 15, delete "in" and insert --independently--, therefor.

In Column 1, Line(s) 45, delete "en" and insert --an--, therefor.

In Column 1, Line(s) 67, delete "crust" and insert --must--, therefor.

In Column 2, Line(s) 5, after "operation", insert --,--.

In Column 2, Line(s) 62, after "speed", insert --,--.

In Column 4, Line(s) 35, after "pathway", insert --;--.

In Column 4, Line(s) 53, delete "controller in" and insert --controller. In--, therefor.

In Column 5, Line(s) 4, delete "time" and insert --times,--, therefor.

In Column 6, Line(s) 10, delete "stem" and insert --system--, therefor.

In Column 8, Line(s) 56, delete "Mowing" and insert --following--, therefor.

In Column 8, Line(s) 64, after "drawings", insert --,--.

In Column 10, Line(s) 60, after "herein", delete "e" and insert --a--, therefor.

In Column 11, Line(s) 5, after "acceleration", insert --,--.

In Column 11, Line(s) 32, after "such", delete ",".

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,795,368 B2

In Column 11, Line(s) 43, delete "10" and insert --104--, therefor.

In Column 11, Line(s) 49, delete "send" and insert --end--, therefor.

In Column 12, Line(s) 13, delete "otter" and insert --other--, therefor.

In Column 12, Line(s) 14, delete "avis" and insert --axis--, therefor.

In Column 12, Line(s) 21, after "physical", delete ",".

In Column 12, Line(s) 24, delete "axis, in" and insert --axis. In--.

In Column 12, Line(s) 30, delete "11" and insert --116--, therefor.

In Column 14, Line(s) 3, after "Accordingly", insert --,--.

In Column 14, Line(s) 35, after "10", insert --,--.

In Column 14, Line(s) 48, delete "in" and insert --128--, therefor.

In Column 14, Line(s) 66, delete "12" and insert --128--, therefor.

In Column 15, Line(s) 26, after "ensure", delete ",".

In Column 15, Line(s) 32, after "person", insert --,--.

In Column 15, Line(s) 41, delete "it" and insert --if--, therefor.

In Column 15, Line(s) 58, delete "virtue" and insert --virtual--, therefor.

In Column 16, Line(s) 54, delete "146" and insert --148--, therefor.

In Column 16, Line(s) 54, delete "over" and insert --mover--, therefor.

In Column 17, Line(s) 5, delete "116, in" and insert --116. In--.

In Column 17, Line(s) 18, delete "154" and insert --156--, therefor.

In Column 17, Line(s) 63, delete "160" and insert --150--, therefor.

In Column 20, Line(s) 1, delete "transits" and insert --transmits--, therefor.

In Column 20, Line(s) 45, delete "then" and insert --than--, therefor.

In Column 20, Line(s) 45, delete "in-nested" and insert --un-nested--, therefor.

CERTIFICATE OF CORRECTION (continued)
U.S. Pat. No. 10,795,368 B2

In Column 20, Line(s) 60, delete "180" and insert --190--, therefor.

In Column 21, Line(s) 41, delete "188" and insert --196--, therefor.

In Column 22, Line(s) 21, delete "predefine" and insert --predefined--, therefor.

In Column 22, Line(s) 47, delete "pieced" and insert --placed--, therefor.

In Column 22, Line(s) 61, delete "end/or" and insert --and/or--, therefor.

In Column 23, Line(s) 20, before "the", insert --,--.

In Column 25, Line(s) 26, delete "an" and insert --analysis--, therefor.

In Column 25, Line(s) 29, after "system", insert --to--.

In Column 25, Line(s) 43, delete "object" and insert --objects--, therefor.